(12) United States Patent
Miyamoto

(10) Patent No.: US 7,930,955 B2
(45) Date of Patent: Apr. 26, 2011

(54) SCREW FASTENER

(75) Inventor: Tsutomu Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/874,715

(22) Filed: Sep. 2, 2010

(65) Prior Publication Data

US 2010/0326244 A1 Dec. 30, 2010

Related U.S. Application Data

(63) Continuation of application No. PCT/JP2008/053797, filed on Mar. 4, 2008.

(51) Int. Cl.
*B25B 21/00* (2006.01)
(52) U.S. Cl. ............................................. 81/54; 81/57.4
(58) Field of Classification Search .................. 81/52, 54, 81/57.4
See application file for complete search history.

(56) References Cited

U.S. PATENT DOCUMENTS

| 6,418,818 | B1 * | 7/2002 | Tham et al. ..................... 81/54 |
| 6,681,659 | B2 * | 1/2004 | Hoe et al. ........................ 81/54 |
| 7,040,196 | B2 * | 5/2006 | Ormachea et al. ............. 81/57.4 |
| 7,586,284 | B2 | 9/2009 | Akita |

FOREIGN PATENT DOCUMENTS

| JP | 3-221331 A | 9/1991 |
| JP | 4-075828 A | 3/1992 |
| JP | 5-60736 U | 8/1993 |
| JP | 2008142824 A * | 6/2008 |
| JP | 2008200799 A * | 9/2008 |
| WO | 2007/105257 A1 | 9/2007 |
| WO | WO 2008099491 A1 * | 8/2008 |

OTHER PUBLICATIONS

International Search Report of PCT/JP2008/053797, mailing date of Apr. 1, 2008.

* cited by examiner

*Primary Examiner* — David B Thomas
(74) *Attorney, Agent, or Firm* — Westerman, Hattori, Daniels & Adrian, LLP

(57) ABSTRACT

A screw fastener includes a screwdriver that includes a sleeve having an absorption hole configured to absorb a top surface of a screw, a bit housed in the absorption hole and having a tip engageable with a recess of the screw, and a rotation unit configured to rotate the bit with the sleeve, a movement unit configured to move the screwdriver between a container configured to accommodate the screw and a work, an optical sensor provided to the sleeve and configured to detect the recess of the screw while a bottom surface of the sleeve and a top surface of the screw are arranged in noncontact manner, and a controller aligns the tip of the bit with the recess of the screw based on a detection result of the pressure detector.

11 Claims, 21 Drawing Sheets

PRIOR ART

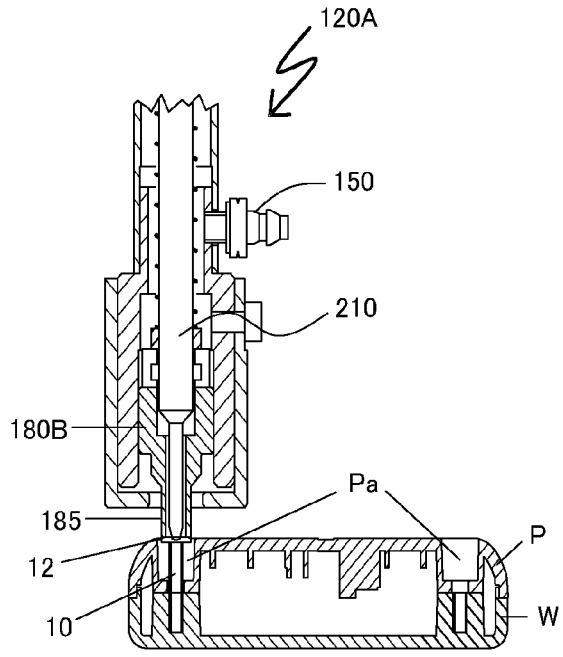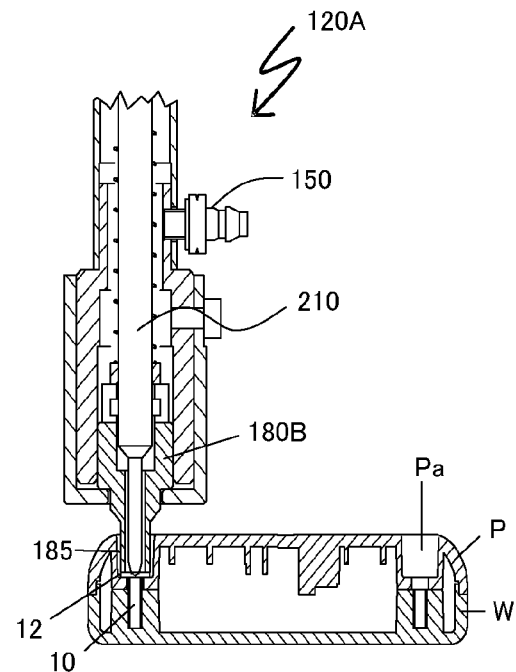
FIG. 19A    FIG. 19B
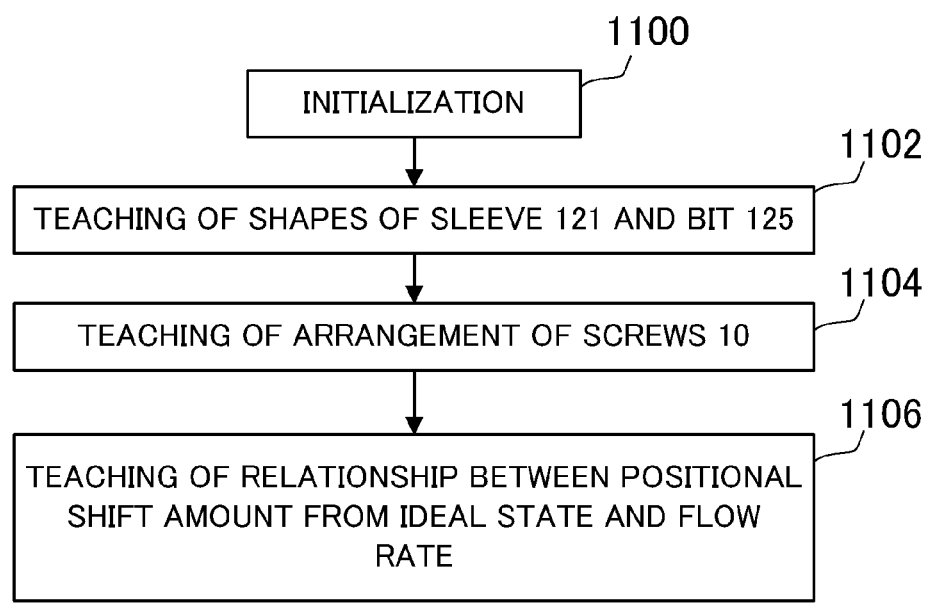
FIG. 20

SCREW FASTENER

CROSS-REFERENCE TO RELATED APPLICATIONS

This application is based upon and claims the benefit of priority of the prior Japanese Patent Application No. PCT/JP2008/053797, filed on Mar. 4, 2008, the entire contents of which are incorporated herein by reference.

FIELD

The embodiment(s) discussed herein are related to a screw fastener including a screwdriver configured to fasten a screw.

BACKGROUND

In automatic screw fastening, a screw is inserted into a screw hole in a work, and a screwdriver fastens the screw. If a member that inserts the screw into the screw hole is the screwdriver itself, fastening can conveniently start just after the insertion. Accordingly, one conventionally proposed method accommodates a screw in a tray on a worktable, picks up the screw engaged with a bit utilizing magnetism and a screwdriver, inserts the screw into a screw hole in a work, and fastens the screw.

This method needs an engagement between the bit of the screwdriver and a recess of the screw in the pickup. The tip of the bit has a convex shape such as a cross and a minus and the recess has a concave shape such as a cross and a minus, but they are not originally aligned with each other and thus cannot be engaged with each other in this state. Therefore, the bit is pressed against the recess and slightly rotated (idled) until the bit is inserted into and engaged with the bit.

Prior art include Patent Documents 1 and 2:
Patent Document 1: Japanese Laid-Open Patent Publication No. 3-221331.
Patent Document 2: Japanese Laid-Open Utility Model Publication No. 5-60736.

However, the idling causes a deformation or a damage of one of the bit and the screw, and a generation of the abrasion powder. The abrasion of the bit and the screw pollutes the product and causes electric and short through the scattered abrasion powder, and the deformation may hinder highly efficient production through defective screw fastening with a specified torque, an increased number of defective products, and an increased number of tool exchanges.

SUMMARY

Accordingly, it is an object in one aspect of the invention to provide a screw fastener configured to prevent damages of a bit and a recess and a generation of abrasion powder.

A screw fastener according to one aspect of the embodiment includes a screwdriver that includes a sleeve having an absorption hole configured to absorb a top surface of a screw, a bit housed in the absorption hole and having a tip engageable with a recess of the screw, and a rotation unit configured to rotate the bit with the sleeve, a movement unit configured to move the screwdriver between a container configured to accommodate the screw and a work, a controller configured to control operations of the screwdriver and the movement unit so as to pick up the screw from the container and to fix a part onto the work with the screw, a pressure detector configured to detect a pressure in the absorption hole, a pressure fluctuation unit configured to fluctuate the pressure in the absorption hole according to a rotational position of the sleeve when the center axis of the screw is aligned with the center axis of the bit and a bottom surface of the sleeve is located close to but spaced from the top surface of the screw, wherein the controller aligns the tip of the bit with the recess of the screw based on a detection result of the pressure detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 19 is a sectional view for explaining an operation of the screw fastener using the screwdriver illustrated in FIG. 17.

FIG. 20 is a variation of the flowchart illustrated in FIG. 11.

DESCRIPTION OF EMBODIMENTS

Figure 1:
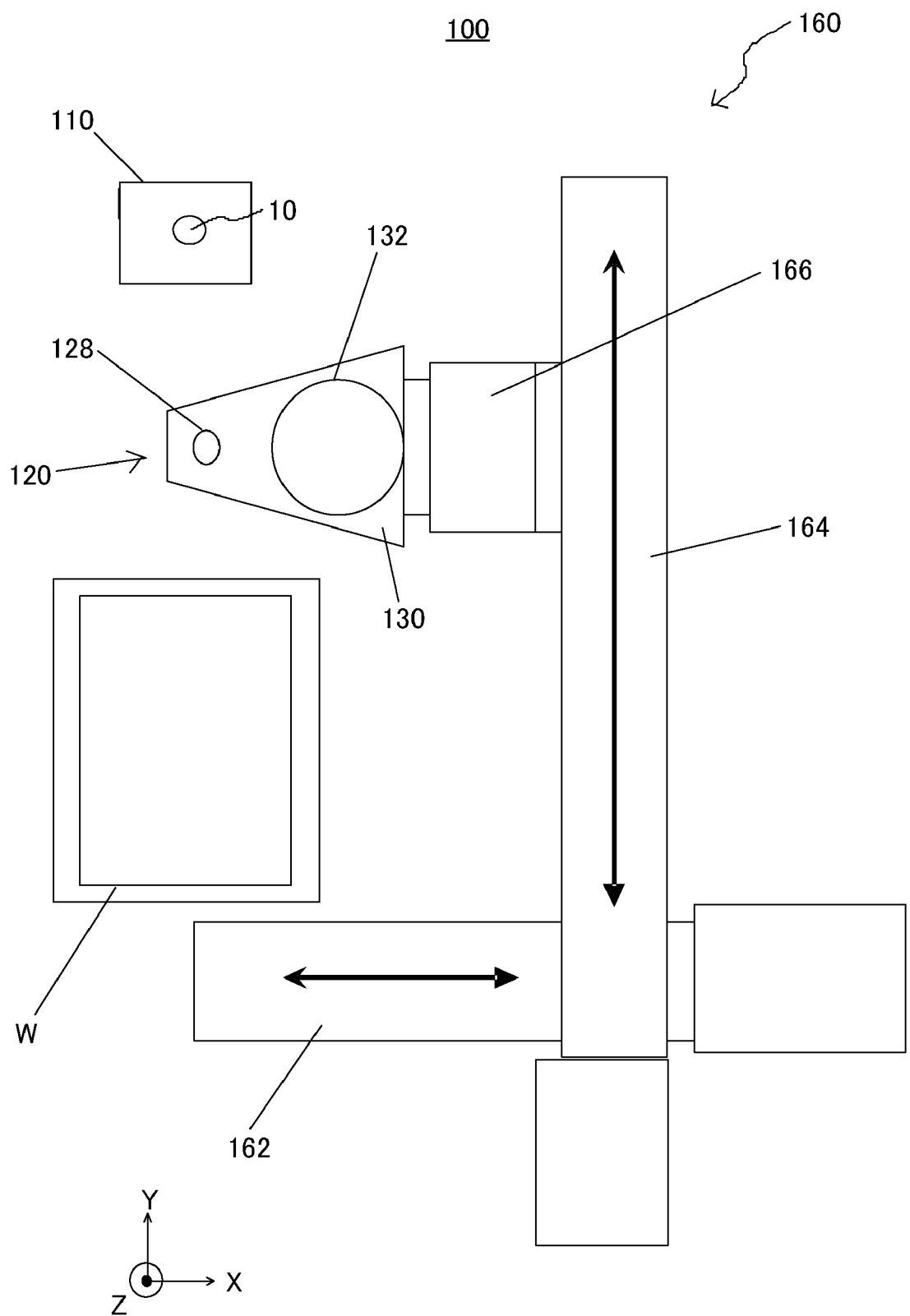
FIG. 1 is a block diagram of a screw fastener of this embodiment.
Figure 2A:
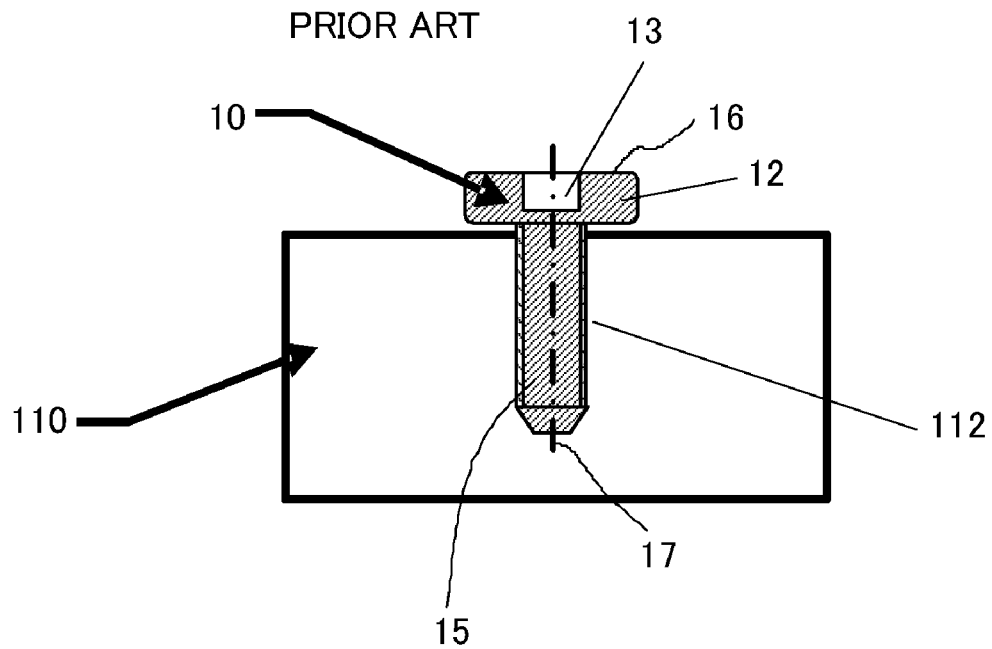
FIGS. 2A and 2B are a sectional view and a top view of a screw placed in a container in the screw fastener illustrated in FIG. 1.

A description will now be given of a screw fastener according to this embodiment with reference to the accompanying drawing. FIG. 1 is a block diagram of a screw fastener 100. In FIG. 1, a lateral direction is an X direction, a longitudinal direction is a Y direction, and a direction perpendicular to the paper plane is a Z direction. FIG. 2A is a partially enlarged sectional view of a container 110. The screw fastener 100 serves to pick up a screw and to fasten a part to a work W as an object to be fastened using the screw, and includes a container 110, a screwdriver 120, a movement unit 160, and a control system.

The container 110 is a tray placed on a worktable (not illustrated), and accommodates one or more screws 10. The screws 10 are supplied one by one or in a lined-up matrix shape to container 110 by a screw supplier (not illustrated). Each screw 10 includes a screw head 12 and a threaded portion 15. The screw 10 has a recess 13 engageable with a screwdriver's bit on a top surface 16 of the screw head 12. A shape of the recess 13 is not particularly limited, such as a minus concave, a cross concave, and a star-shaped concave.

Figure 2B:
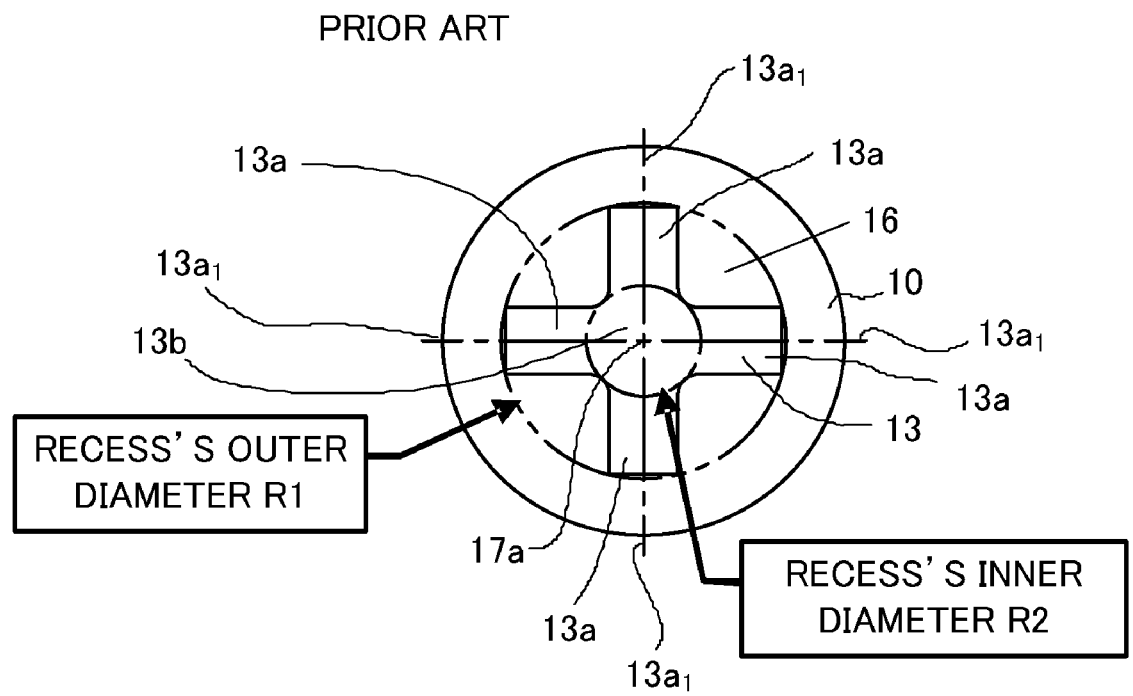

The recess 13 of this embodiment has a cross shape as illustrated in FIG. 2B. In this case, the recess 13 has four dents 13a and one cone 13b. As illustrated in FIG. 2B, when the screw 10 is viewed from the top, each dent 13a extends in the radial direction around a center 17a that is the center axis 17 of the screw 10 illustrated in FIG. 2A and centerlines $13a_1$ of these four dents 13a spread at 90° intervals around the center 17a. The cone 13b is provided at the center of the screw 10 using the center axis 17 as a center axis. R1 is a diameter of a circle that passes an outermost part of the dents 13a of the recess 13. R2 is a diameter of a bottom surface of the cone 13b (or an internal diameter of the recess 13).

For the tray supply, the container 110 has a hole 112 into which the threaded portion 15 of the screw 10 is inserted as illustrated in FIG. 2A. A hole 112 is not threaded and the screw 10 is not fixed in the hole 112. The screw 10 is sequentially supplied to the hole 112 along a longitudinal direction of the hole 112 and picked up from the hole 112 by the screwdriver 120. The screw 10 is rotatable in the hole 112. In this embodiment, the screw 10 is mounted in the container 110 while a phase or direction of the recess 13 is not previously set. Since it is unnecessary to control the phase of the screw 10 beforehand, the installation operation of the screw becomes easier.

In this embodiment, the work W is a lower case (base) of a housing of a cellular phone, and the screw fastener 100 screws an upper case (cover) of the housing that is a part of the cellular phone onto the lower case. In another embodiment, the work W is a hard disk drive ("HDD"), and the screw fastener 100 screws a clamping ring as a part to a spindle hub of the HDD. The spindle hub is coupled with a spindle motor, mounted with a magnetic disk, and configured to rotate with the magnetic disk. The clamping ring has a plurality of screw holes, and fixes onto the spindle hub with a constant pressure the magnetic disk that has been attached around the spindle hub.

Figure 3:
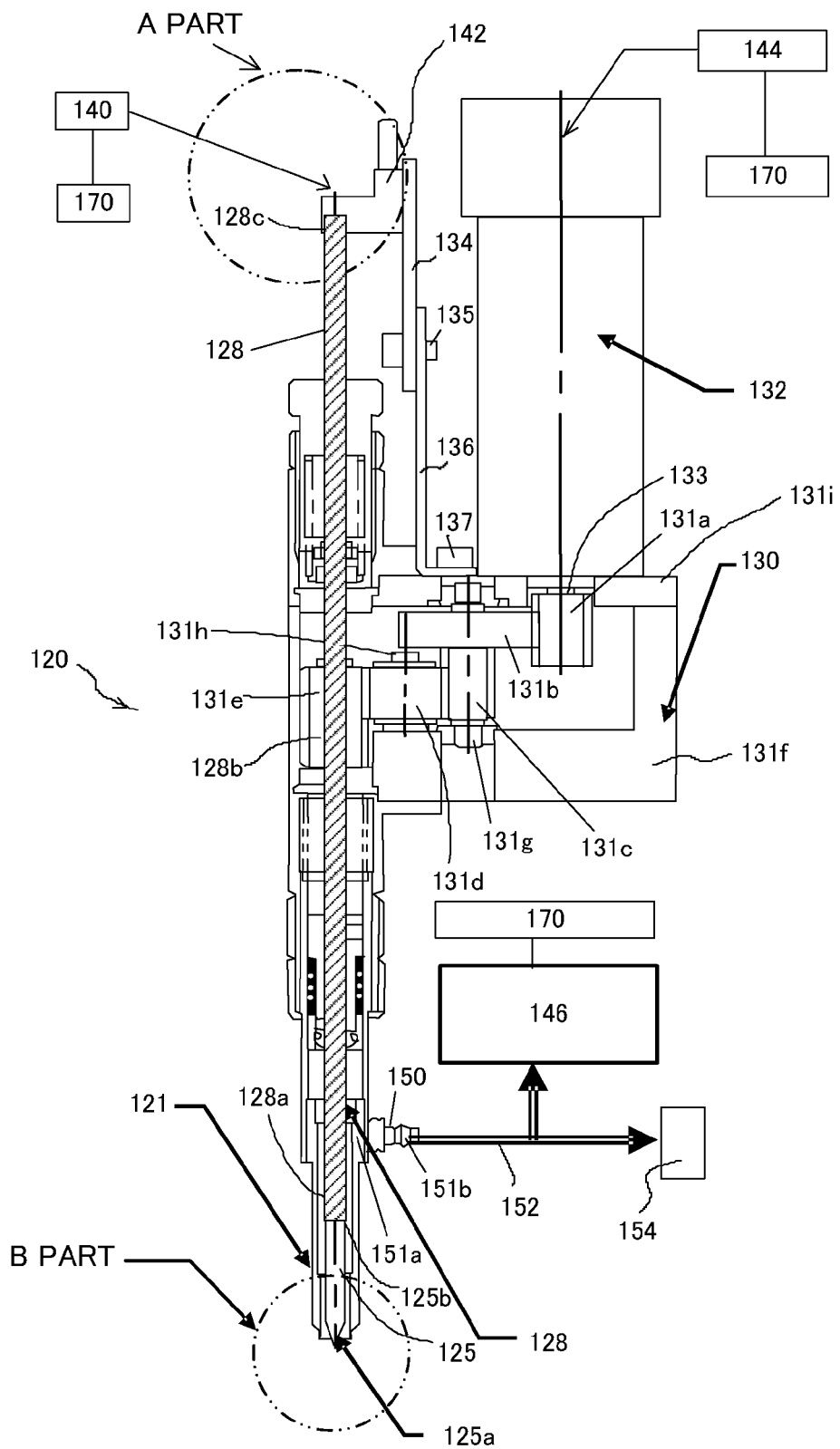
FIG. 3 is a sectional view of a screwdriver in the screw fastener illustrated in FIG. 1.

The screwdriver 120 rotates a (screwdriver) bit 125, automatically fastens the screw 10, and includes a sleeve 121, a bit 125, a bit driving system, a variety of types of detectors, and a suction system, as illustrated in FIG. 3.

Figure 4A:
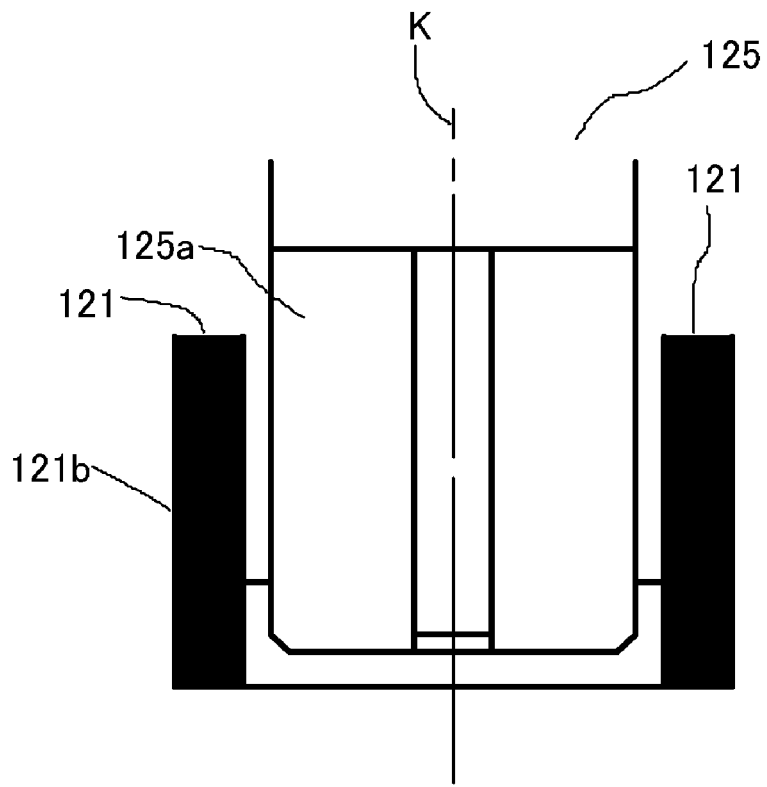
FIGS. 4A and 4B are a sectional view and a bottom view of a lower portion of a sleeve of the screwdriver illustrated in FIG. 3.
Figure 4B:
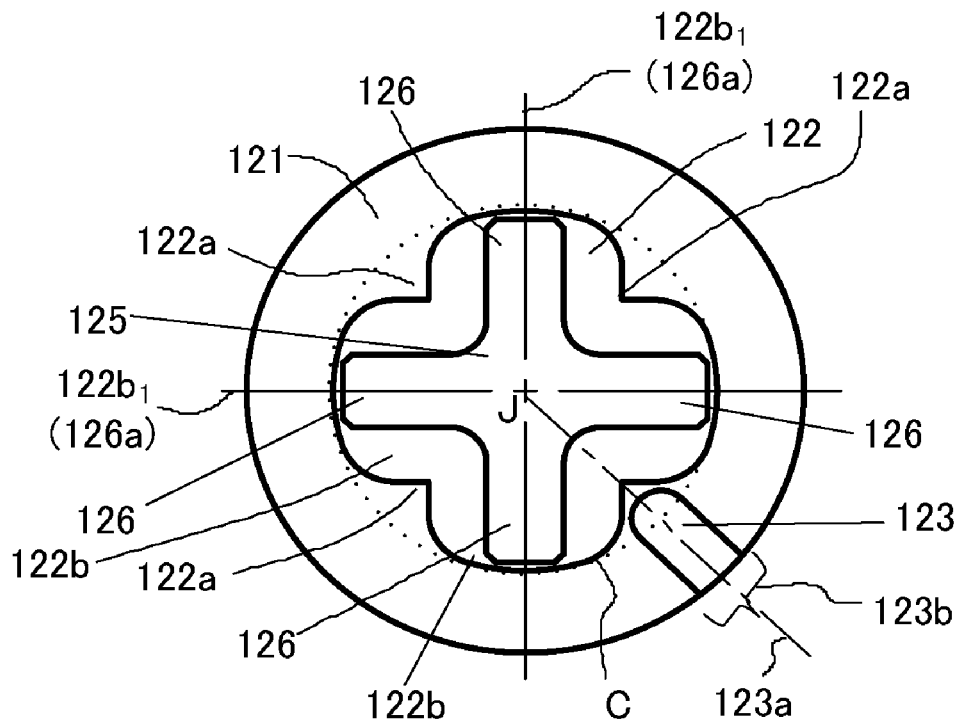
Figure 5A:
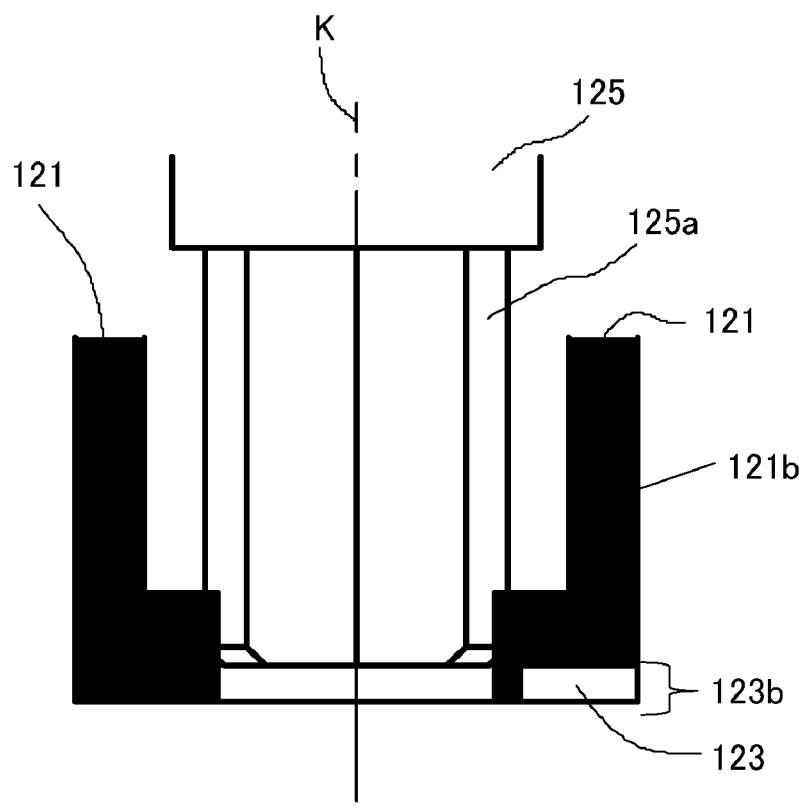
FIGS. 5A and 5B are a sectional view and a bottom view of the lower portion of the sleeve that is located at a rotational position different from FIG. 3.
Figure 5B:
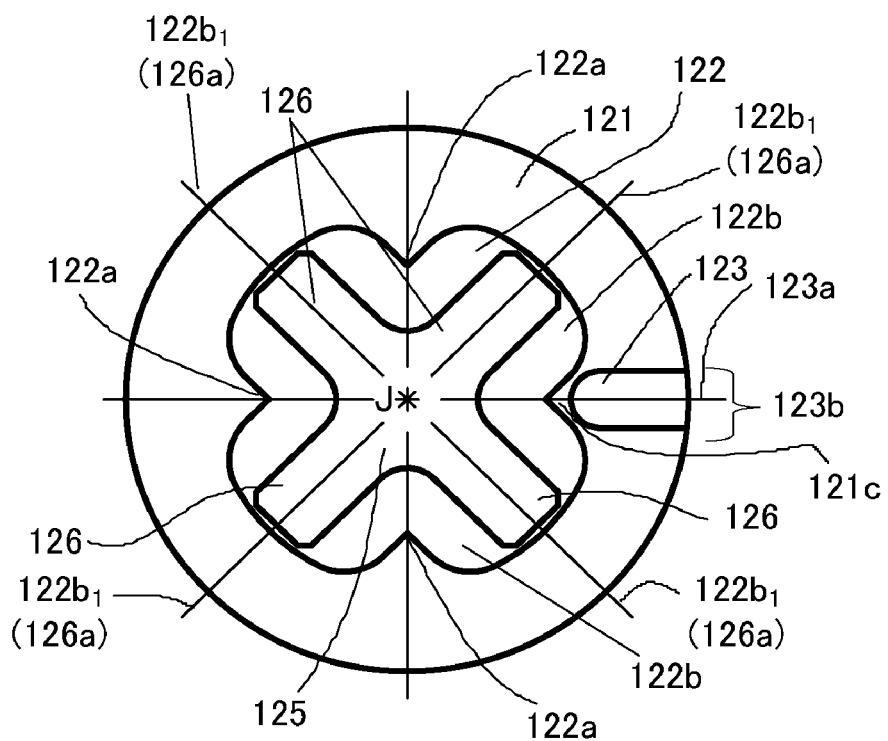
Figure 6A:
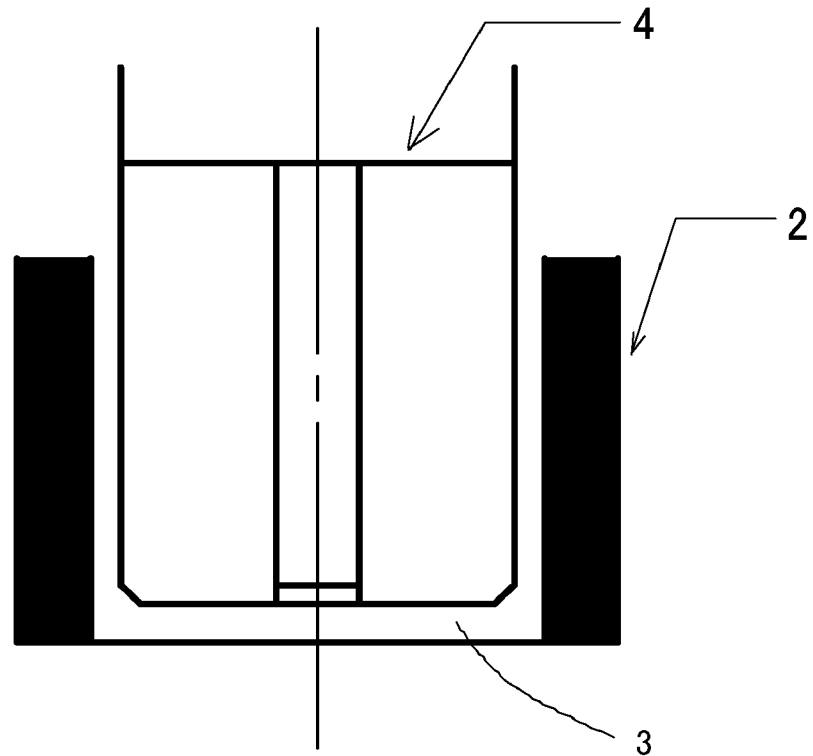
FIGS. 6A and 6B are a sectional view and a bottom view of the lower portion of the conventional screwdriver.
Figure 6B:
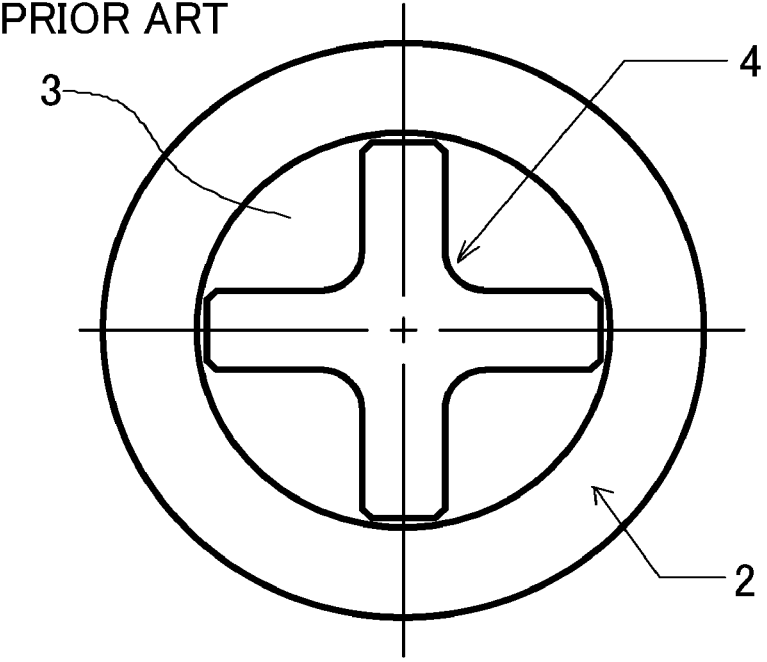

FIG. 4A is an enlarged sectional view of the lower portion of the sleeve 121 (a B part illustrated in FIG. 3). FIG. 4B is a bottom view of the sleeve 121 illustrated in FIG. 4A. FIG. 5A is an enlarged sectional view of the lower portion of the sleeve 121 that has rotated clockwise by 45° from a rotational position illustrated in FIG. 4A. FIG. 5B is a bottom view of the sleeve 121 illustrated in FIG. 5A. FIG. 6A is a sectional view of the lower portion of a conventional sleeve 2. FIG. 6B is a bottom view of the sleeve 2 illustrated in FIG. 6A.

The sleeve 121 has a hollow, approximately cylindrical shape, a center absorption hole (hollow) 122 configured to absorb the top surface 16 of the screw 10, and a groove 123 at a rim, as illustrated in FIGS. 4B and 5B. The absorption hole 122 accommodates the bit 125 and a part of a shaft 128. A material of the sleeve 121 is not limited. In this embodiment, the sleeve 121 is made of resin, and the absorption hole 122 and the groove 123 are formed by injection molding.

In prior art, a certain sleeve is fixed relative to a bit in fastening a screw, and a screw head of the screw is inserted into the absorption hole (or the absorption hole is larger than the top surface of the screw), and the bit rotates and fastens the screw. However, in fastening the screw, a side surface of the screw head contacts the inner surface of the absorption hole of the sleeve and gets worn out, causing the abrasion powder. On the other hand, according to this embodiment, the sleeve 121 rotates with the bit 125, and the screw 10 and the sleeve 121 rotate together. The absorption hole 122 is smaller than the top surface 16 of the screws 10. As a result, no abrasion powder occurs.

As illustrated in FIGS. 4B and 5B, the adsorption hole 122 has a sectional or bottom shape as well as a shape of the recess 13 of the screw 10 and a shape of the tip 125a of the bit 125. On the other hand, according to the prior art, the absorption hole 3 of the sleeve 2 has a cylindrical shape as illustrated in FIGS. 6A and 6B. The bit 4 has the same structure as that of the bit 125.

Thus, the absorption hole 122 of this embodiment has no cylindrical shape as in the prior art. The bit 125 may not have a cylindrical shape because it is rotated with the sleeve 121. More specifically, as illustrated in FIG. 4B, a bottom shape of the adsorption hole 122 has four concaves 122a that retreat to the inside of a circle C illustrated by a dotted line which has an outer diameter R1 of the recess 13. This concave 122a can be used for a detector spot configured to detect an orientation or a phase of the recess 13 of the screw 10. It is necessary that the detector spot corresponds to the recess 13 when the sleeve 121 is located at a certain rotational position, and the detector spot shifts from the recess 13 when the sleeve 121 is located at another rotational position. Here, when the absorption hole 122 is viewed from the bottom, the center of cylindrical sleeve 121 or the center of bit 125 accords with a center J corresponding to a center axis K of the bit 125 or the sleeve 121. The circle C is a virtual circle having the center J as a center and passes the outermost diameter of the tip 125a of the bit 125.

In this embodiment, there are four concaves 122a corresponding to the cross shape. The cross-shaped adsorption hole 122 has four convexes 122b, and each convex 122b has a centerline $122b_1$ that extends in the radial direction from the center J. In other words, each convex 122b extends along the centerline $122b_1$. The centerline $122b_1$ is a line with respect to which each convex 122b is in line symmetry. As illustrated in FIGS. 4B and 5B, when the absorption hole 122 is viewed from the bottom, four centerlines $122b_1$ spread around the center J at 90° intervals.

As illustrated in FIGS. 7A, 7B, 8A and 8B, the groove 123 fluctuates the pressure in the absorption hole 122 according to the rotational position of the sleeve 121 when the center axis 17 of the screw 10 is aligned with the center axis K of the sleeve 121 (or the bit 125) and the bottom surface 121a of the sleeve 121 is located close to the top surface 16 of the screw 10 in a noncontact manner. The groove 123 connects the adsorption hole 122 to and disconnects the absorption hole 122 from the external air according to the rotational position of the sleeve 121.

Figures 7A, 7B:
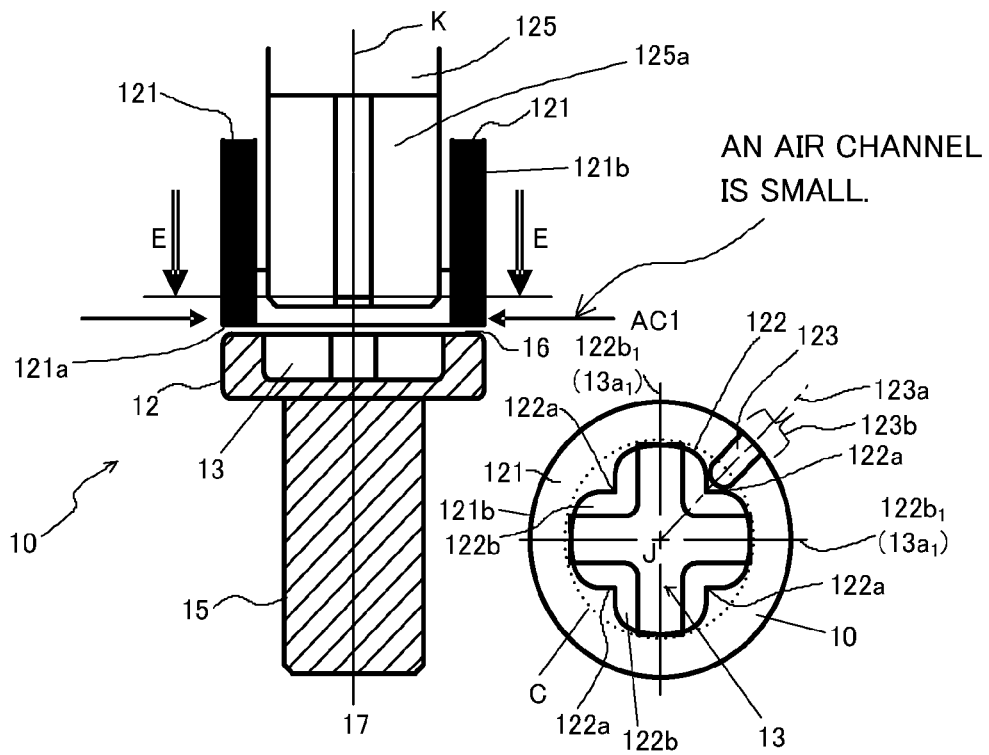
FIGS. 7A and 7B are a longitudinal sectional view and a cross sectional view of the lower portion of the sleeve when the recess of the screw shifts from the groove of the sleeve while the sleeve illustrated in FIGS. 4A and 4B is located close to the top surface of the screw.
Figures 8A, 8B:
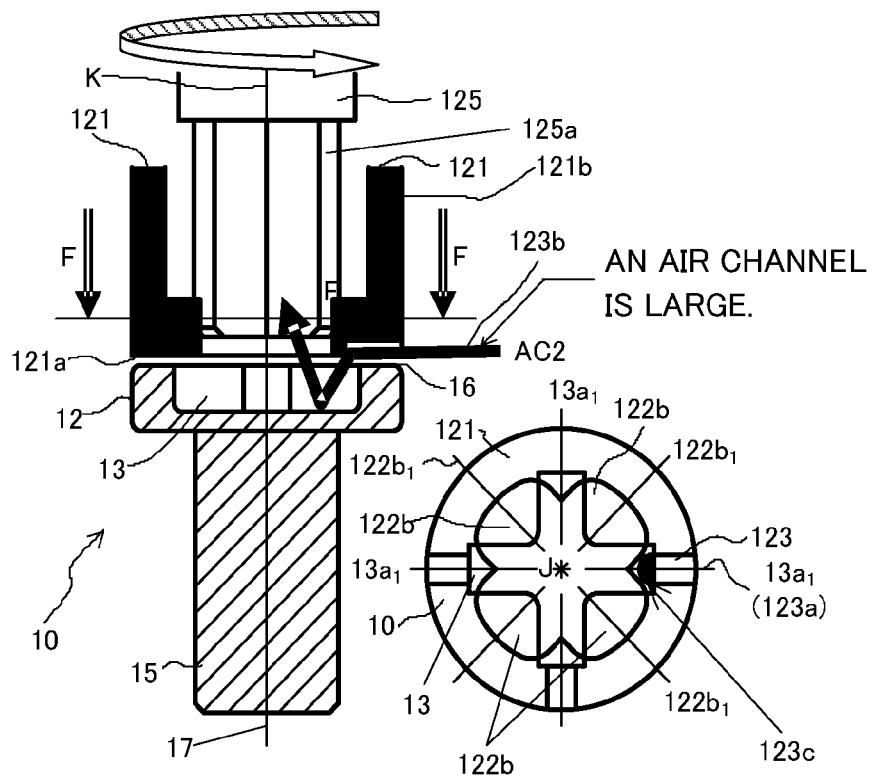
FIGS. 8A and 8B are a longitudinal sectional view and a cross sectional view of the lower portion of the sleeve that is located at a rotational position different from FIGS. 7A and 7B.

FIG. 7A is a sectional view of the lower portion of the sleeve 121 when the sleeve 121 is located close to the top surface 16 of the screw 10 (at a distance of about 0.2 mm) FIG. 7B is a sectional view of FIG. 7A viewed from an E-E direction. FIG. 8A is a sectional view of the lower portion of the sleeve 121 located at a rotational position that has rotated clockwise by 45° from FIG. 7A around the center J. FIG. 8B is a sectional view of FIG. 8A viewed from an F-F direction. In FIGS. 7B and 8B, the center axis K of the bit 125 or the sleeve 121 is aligned with the center axis 17 of the screw 10 in the vertical direction.

The "noncontact" intends to exclude a situation in which dust and deformations may occur at a contact spot when the sleeve 121 rotates (idles) while the bottom surface 121a of the sleeve 121 contacts the top surface 16 of the screw 10. The "close" is a location or distance at which the pressure fluctuation can be detected, and 0.2 mm in this embodiment, although it is different according to a shape (such as a cross shape and a star shape) and a size (such as an outer diameter R1) of the recess 13 of the screw 10.

The groove 123 is separates from the absorption hole 122, and the absorption hole 122 and the groove 123 are separated from a diaphragm 121c. When the groove 123 is connected to the absorption hole 122, an effect of the pressure fluctuation reduces.

The groove 123 is formed in a bottom surface 121a of the sleeve 121 as illustrated in FIGS. 4B and 5B. In addition, the groove 123 opens to air on the bottom surface 121a and the cylindrical side surface 121b of the sleeve 121. The groove 123 possesses a U-shaped outline when it is viewed from the bottom surface 121a of the sleeve 121, and has a shape that combines a quarter sphere and semi-cylinder with each other.

The groove 123 has a centerline 123a that extends from the center J in the radial direction, and an angle is 45° between the centerline 123a and a centerline $122b_1$ of a convex 122b at both sides of the groove 123 which are closest to the centerline 123a. The centerline 123a is a line with respect to which the groove 123 is in line symmetry. The groove 123 has an open end 123b connected to the cylindrical side surface 121b of the sleeve 121. A size of the open end 123b is not limited.

When the groove 123 is viewed from the bottom surface 121a side of the sleeve 121, the groove 123 projects to the inside of the virtual circle C that passes the outermost diameter of the tip 125a of the bit 125 around the center J. In this embodiment, this projection is almost the above quarter sphere (123c of FIG. 8B). According to a rotational position of the sleeve 121, this projection 123c may be connected to or disconnected from the recess 13.

When the projection 123c is disconnected from the recess 13 as illustrated in FIGS. 7A and 7B, the internal pressure of the absorption hole 122 is maintained almost constant due to the absorption hole 122 and the recess 13 although the bottom surface 121a of the sleeve 121 is slightly spaced from the top surface 16 of the screw 10. On the other hand, the internal pressure of the absorption hole 122 decreases when the projection 123c is connected to the recess 13, as illustrated in FIGS. 8A and 8B, because the absorption 122 and the recess 13 and the groove 123 are connected to each other and the absorption hole 122 is connected to the groove 123 that opens to air via the recess 13.

Assume that n is the number of projections 126 of the tip 125a of the bit 125 or the number of the convexes 122b of the absorption hole 122 (although n=4 in this embodiment). In this case, an angle may be set to 360°/2n (or 45° in this embodiment) between the centerline 123a of the groove 123 and the centerline (not illustrated) of the projection 126 of the bit's tip 125a closest to the groove 123 or the centerline $122b_1$ of the convex 122b of the absorption hole 122 closest to the groove 123. The projections 126 of the bit's tip 125a or the convexes 122b of the absorption hole 122 closest to the groove 123 are located on both sides of the groove 123. Assume that the angle becomes equal to 360°/2n between the centerline 123a of the groove 123 and the centerline $122b_1$ (126a) at both sides of the groove 123. Then, after the groove 123 is aligned with the dent 13a of the recess 13, the dent 13a of the recess 13 can be aligned with the projection 126 of the bit's tip 125a even if the sleeve 121 is rotated by 360°/2n clockwise or counterclockwise. Of course, once the rotational direction is determined, an angle between two adjacent centerlines $122b_1$ around the center J may be divided to an angle other than 360°/2n.

The groove 123 is disconnected from the recess 13 at the rotational position shown in FIGS. 7A and 7B. In addition, the groove 123 is connected to the recess 13 when the sleeve 121 is located at a rotational position illustrated in FIGS. 8A and 8B. The quarter sphere 123c of the groove 123 is arranged on the dent 13a of the recess 13 in FIG. 8B. Thus, the groove 123 is connected to the recess 13 when the sleeve 121 is located at a certain rotational position and disconnected from the recess 13 when the sleeve 121 is located at another rotational position.

FIGS. 7A and 7B illustrate that the phase of the dent 13a of the recess 13 accords with the phase of the convex 122b of the sleeve 121 (or the projection 126 of the tip 125a of the bit 125), and the centerline $13a_1$ agrees with the centerline $122b_1$. An arrow AC1 illustrated in FIG. 7A represents an air channel. The air channel AC1 is formed in a gap between the bottom surface 121a of the sleeve 121 and the top surface 16 of the screw 10. Since the bottom surface 121a of the sleeve 121 and the top surface 16 of the screw 10 are arranged close to each other, the flow rate in the air channel AC1 is small.

FIGS. 8A and 8B illustrate that the phase of (the dent 13a of) the recess 13 and (the convex 122b of) the sleeve 121 shift from each other by 45°, and one centerline $13a_1$ among the four dents 13a accords with the centerline 123a. An arrow AC2 illustrated in FIG. 8A represents an air channel. The air channel AC2 is formed by a gap between the bottom surface 121a of the sleeve 121 and the top surface 16 of the screw 10 and the open end 123b of the groove 123. Since a large amount of external air flows in from the open end 123b, the flow rate is large. The flow rate of the air channel AC1 and the flow rate of the air channel AC2 are detected, and the groove 123 has a depth and a size of the open end 123b so that a pressure difference between them can be detected. This embodiment does not limit the depth of the groove 123 and the size of the open end 123b.

The bit 125 is a cylindrical member that includes the tip (bottom end) 125a and a proximal end (top end) 125b.

The tip 125a is engageable with the recess 13 of the screw 10, and has a cross shape as illustrated in FIGS. 4B and 5B. This embodiment does not limit a shape of the bit's tip 125a as long as the bit 125 can fasten the screw 10. The screw 10 can be fastened with the work W when the tip 125a of the bit 125 is engaged with the recess 13 of the screw 10 and rotated.

The tip 125a of the bit 125 of this embodiment has four projections 126. Each projection 126 is engageable with each dent 13a of the recess 13. When the sleeve 121 is viewed from the bottom surface side as illustrated in FIG. 4B, the tip 125a is slightly smaller than the recess 13 of the screw 10 viewed from the top surface side as illustrated in FIG. 2B. Each projection 126 has the centerline 126a that extends from the center J in the radial direction. In other words, each projection 126 extends along the centerline 126a. The centerline 126a is a line with respect to which each projection 126 is in line symmetry. Four centerlines 126 spread around the center J at 90° intervals when the tip 125 is viewed from the bottom surface, as illustrated in FIGS. 4B and 5B.

This embodiment makes the bit 125 of a magnetic material and the screw 10 of metal. Thus, when the tip 125a is engaged with the recess 13, the screw 10 is fixed to the bit 125. As a result, the bit 125 is inserted into and engaged with the recess 13 of the screw 10 in the container 110, and when the bit 125 rises it can pick up the screw 10. However, since the absorption hole 122 absorbs the top surface 16 of the screw 10, the magnetic absorption is not necessarily required.

The proximal end 125b is mechanically engaged with a bottom end 128a of the shaft 128 of a bit driving system. Their engagement shapes are not limited. As a result, the bit 125 and the shaft 128 rotate together.

The bit driving system is a mechanism configured to rotate and drive the bit 125, and includes the shaft 128, a gearbox 130, and a servo motor 132.

Figure 9:
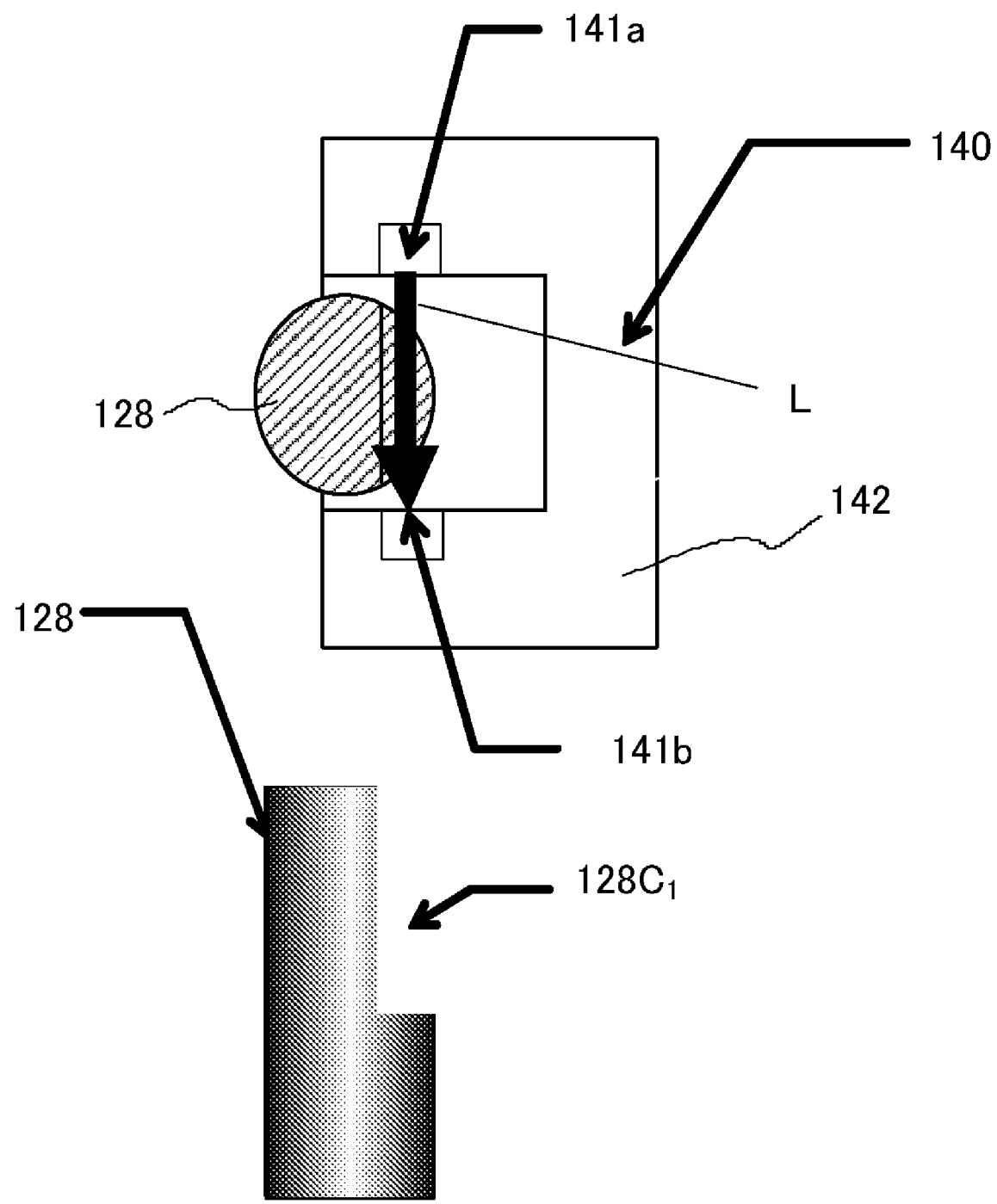
FIG. 9 is an enlarged side view and a sectional view of an A part in FIG. 3.

The shaft 128 is a cylindrical member that includes the bottom end 128a, an engagement member 128b, and a top end 128c. The bottom end 128a is engaged with the proximal end 125b of the bit 125. A gear 131e of the gearbox 130 of the bit driving system is fixed around the engagement member 128b. As a result, the shaft 128 rotates with the gear 131e. The top end 128c of the shaft 128 has a notch $128c_1$ as illustrated in FIG. 9. Here, FIG. 9 is an enlarged side view and sectional view of the A part in FIG. 3. It is optional to provide the bit 125 and the shaft 128 as separate members, and the bit 125 and the shaft 128 may be integrated into one body.

The servo motor 132 has a motor shaft 133, and is supplied with the power via a cable (not shown). A gear 131a of the gearbox 130 is provided around the motor shaft 133. Therefore, the motor shaft 133 and the gear 131a rotate together. The motor shaft 133 projects with the gear 131a from a hole of a lid 131i of the gearbox 130 to the inside of the gearbox 130.

A variety of detectors include a rotational position detector 140, a rotational position detector (encoder) 144, and a vacuum monitoring detector 146.

The gearbox 130 transmits the power (torque) of the motor 132 to the shaft 128. A case 131f of the gearbox 130 is fixed onto the sleeve 121, and the case 131f is covered by the lid 131i. The gearbox 130 includes a gear row (gears 131a to 131e). The gear 131a is fixed around the motor shaft 133 of the motor 132 and rotates with the motor shaft 133. The gear 131b is fixed around the axis 131g, and engaged with the gear 131a. The axis 131g is rotatably held by the case 131f. The gear 131c is fixed around the axis 131g and engaged with the gear 131d. The gear 131d is fixed around the axis 131h and engaged with the gear 131e. The axis 131h is rotatably held by the case 131f. As a result, the rotational force of the motor 132 is transmitted to the shaft 128.

The rotational position detector 140 is configured to detect that the bit 125 engaged with the shaft 128 is located at a rotational position (origin position) by detecting a rotational position of the shaft 128. The rotational position detector 140 is an optical sensor and includes, as illustrated in FIG. 9, a light emitter 141a, a light receiver 141b, and a frame 142 that supports the light emitter 141a and the light receiver 141b. However, a type of the sensor 140 is not limited to the transmission type optical sensor.

Light L that travels from the light emitter 141a to the light receiver 141b can be detected only when a notch $128c_1$ of the top end 128c of the shaft 128 is located at a position illustrated in FIG. 9. A detection result by the light receiver 141b is transmitted to the controller 170. The frame 142 is fixed onto a support plate 134 having a plate shape, and the support plate 134 is fixed onto one end of an L-shaped support plate 136 by the screws 135. The other end of the support plate 136 is fixed onto the lid 131i of the gearbox 130 with the screw 137. As a result, the frame 142 is fixed onto the gearbox 130.

The notch $128c_1$ is made by cutting an arc sectional shape from the shaft 128 in the longitudinal direction of shaft 128. The vertical end surface of the notch $128c_1$ decenters from the vertical center axis of the shaft 128. When the vertical end surface of the notch $128c_1$ contains the vertical central axis of the shaft 128, the detector 140 similarly detects it even when the shaft 128 is rotated by 160°, and the rotational position of the shaft 128 cannot be uniquely detected. Of course, since the bit 125 is symmetrical even if it rotates by 180°, the end surface may be formed at the center. The notch $128c_1$ detected by the detector 140 is not limited to a shape illustrated in FIG. 9. For instance, it may be formed as a concave (groove) or a projection.

As described above, the screw 10 is accommodated in the container 110 while its phase and orientation are not aligned with constant directions. Therefore, even if the bit 125 is positioned at the origin position by the rotational position detector 140, it is not always inserted into and engaged with the recess 13 with no rotation. In other words, the tip 125a of the bit 125 is not aligned with the recess 13 of the screw 10 only by positioning the bit 125 to the origin position.

The rotational position detector 144 is an encoder configured to detect a rotational angle of the motor 132. The rotational position detector 144 is provided to the motor shaft 133, and is a rotary encoder configured to detect the rotational position of motor shaft 133, and is connected to the controller 170. The rotational position detector 144 can be used to detect the rotational position of the bit 125, and in this case the controller 170 may use only one of the rotational position detectors 140 and 144. This embodiment uses the rotational position detector 140 so as to return the bit 125 to the origin position, and uses the rotational position detector 144 for an alignment between the tip 125a of the bit 125 and the recess 13 of the screw 10 based on the detection result of the vacuum monitoring detector 146.

The rotary encoder when it is an absolute type can detect an absolute position as well as the rotational position detector 140. Thus, in this case, the rotational position detector 144 sets the rotational position (rotational angle) of the motor shaft 133 to the origin when the bit 125 is located at the origin position and detects it. On the other hand, the rotary encoder when it is an increment type can calculate a rotational direction and a rotational amount based on a phase shift between two pulses. Since the rotational amount in this case is a rotational amount of the motor shaft 133, the rotational amount of motor shaft 133 is multiplied by a gear ratio so as to convert it into the rotational amount of bit 125. After the rotational amount is calculated necessary for the bit 125 to return to the origin position, it may be converted into a rotational amount of the motor shaft 133.

The suction system (vacuum drawing unit) sucks the inside of the absorption hole 122 of the sleeve 121, decreases the internal pressure, and provides the bottom of the sleeve 121 to attract the screw 10. The suction system includes a suction plug 150, a tube 152 attached to the suction plug 150, and a vacuum pump 154. The suction plug 150 includes a threaded portion 151a connected to the absorption hole 122 of the sleeve 121, and a connector 151b connected to the tube 152. One end of the tube 152 is connected to the connector 151b of the suction plug 150, the other end of the tube 152 is connected to the vacuum pump 154, and an intermediate portion of the tube 152 is connected to the vacuum monitoring detector 146. The tube 152 includes not only the metallic piping but also elastic members such as a hose and a tube. A well-known structure is applicable to the vacuum pump 154.

The vacuum monitoring detector 146 is a pressure gauge or a flow meter configured to detect the internal pressure of the tube 152 (or the hole absorption hole 122 of the sleeve 121), and informs the detection result to the controller 170.

The movement unit 160 serves to three-dimensionally move the screwdriver 120 between the container 110 and the work W, and includes an X-axis robot 162, a Y-axis robot 164, and a Z-axis robot 166. The X-axis robot 162 moves the screwdriver 120 in the lateral direction illustrated in FIG. 1. The Y-axis robot 164 moves the screwdriver 120 in the longitudinal direction illustrated in FIG. 1. The Z-axis robot 166 moves the screwdriver 120 in a direction perpendicular to the paper plane of FIG. 1. These robots can apply a well-known structure in the art, and a detailed description thereof will be omitted.

The control system includes the controller 170. The controller 170 controls a rotation of the servo motor 132 of the screwdriver 120 and a movement of the screwdriver 120 by the movement unit 160 in picking up the screw 10, in mounting the screw 10, and in fastening the screw 10. The controller 170 includes a processor such as a MPU, and a memory (not illustrated) such as a RAM, and ROM. The controller 170 controls operations of the screwdriver 100 and the movement unit 160 so that the screw 10 can be picked up from the container 110 for storing the screws 10, and the part is fixed onto the work W by the screw 10.

A description will now be given of the operation of the screw fastener 100 (controller 170) with reference to the flowchart illustrated in FIGS. 10 to 12.

Firstly, an initialization is performed (step 1100).

Figure 11:
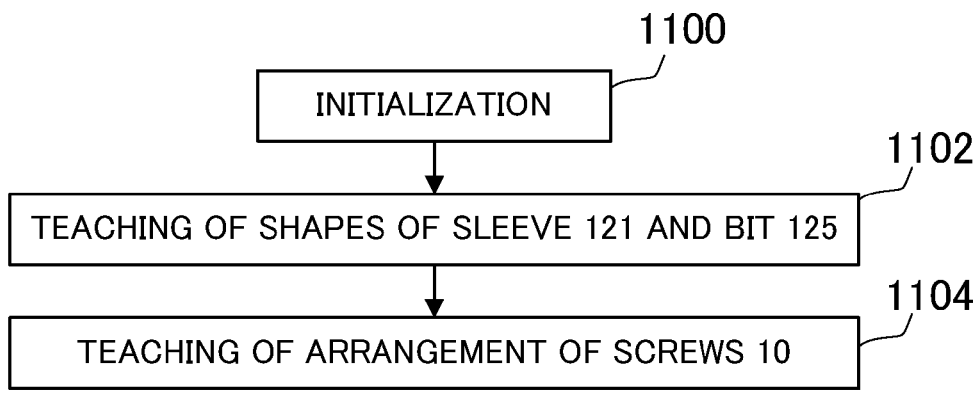
FIG. 11 is a flowchart for explaining the details of the step 1100 illustrated in FIG. 10.

In the initialization, as illustrated in FIG. 11, the teaching of shapes of the sleeve 121 and the bit 125 is performed (step 1102). In the step 1102, for example, the controller 170 stores information that the centerlines $122b_1$ of the convex 122b of the sleeve 121 and the centerlines 126a of the projection 126 of the tip 125a of the bit spread at 90° (more specifically 360°/2n) intervals, and the centerline 123a of the groove 123 is arranged at an angle of 45° (such as 360°/2n) with respect to two adjacent centerlines $122b_1$ or 126a.

Next, the teaching of the arrangement of the screw(s) 10 is performed (step 1104). In the step 1104, for instance, the controller 170 stores information of the center coordinates of the holes 112 for one or more screws 10 in the container 110. Thereby, the controller 170 calculates and stores a movement amount of each robot of the movement unit 160 in aligning the center axis K of the sleeve 121 or bit 125 with the center axis 17 of each screw 10.

Next, the screw 10 is picked up by the movement unit 160 (step 1200). Referring now to FIG. 12, a detailed description will be given of the pickup operation of the step 1200.

Initially, the controller 170 determines whether the container 110 configured to house the screw 10 is placed on a worktable (not illustrated) (step 1202). This determination can use a detection result of a detector and a camera (not illustrated) provided to the worktable (not illustrated). In addition, at the same time, the controller 170 determines whether there is a screw in the container 110. While this embodiment accommodates only one screw 10 in the container 110, a plurality of screws 10 may be simultaneously picked up and attached to the work W in another embodiment. For instance, when six screws are picked up at the same time using six screwdrivers 120, the controller 170 determines whether a predetermined number of (or 6) screws 10 are housed in the container 110. This determination is made by the detector or the camera provided to the container 110 which is configured to detect whether the screw hole of the container 110 is closed. The controller 170 waits for picking up until these conditions are satisfied, and provides an error indication if necessary. In the step 1202, the direction of the recess 13 of the screw 10 is arbitrary, and the controller 170 does not recognize that direction.

Next, the bit 125 is returned to the origin position (step 1204). In the step 1204, the controller 170 of this embodiment acquires the detection result of rotational position detector 140, drives the servo motor 132 based on the detection result, rotates the shaft 128 and the bit 125. In the step 1204, when it is determined that the bit 125 is not at the origin position, the controller 170 rotates the bit 125 via the motor 132 until the light receiver 141b of detector 140 detects the light L or the bit 125 is moved to the origin position. Thereby, the bit 125 is positioned in the state illustrated in FIG. 9.

Next, the screwdriver 120 is descended to a search position until the bottom surface 121a of the sleeve 121 is located close to the top surface 16 of the screw 10 in a noncontact manner (step 1206). At the search position, a distance between the bottom surface 121a of the sleeve 121 and the top surface 16 of the screw 10 is, for instance, as illustrated in FIGS. 7A and 8A. In the step 1206, the controller 170 drops the screwdriver 120 via the Z-axis robot 166 of the movement unit 160.

Next, the sleeve 121 and the bit 125 are rotated through the servo motor 132 (search) (step 1208). A minimum rotational angle is 360°/n. A maximum rotational angle is 360°. For instance, assume that as a result of the step 1206, the groove 123 is located at a position illustrated in FIG. 7B (although an angle between the centerline 123a of the groove 123 and the adjoining centerline $122b_1$ (and 126a) need not be 45°. When the sleeve 121 and the bit 125 are rotated around the center J clockwise, the centerline 123a of the groove 123 reaches the position corresponding to the centerline $13a_1$ of the right dent 13a as illustrated in FIG. 8B. At this time, since the flow rate of the air channel AC2 is large as illustrated in FIG. 8A, the pressure drop becomes a peak. This peak of the pressure drop appears every 90° when the rotational angle of the step 1208 is 360°.

Figures 14A, 14B:
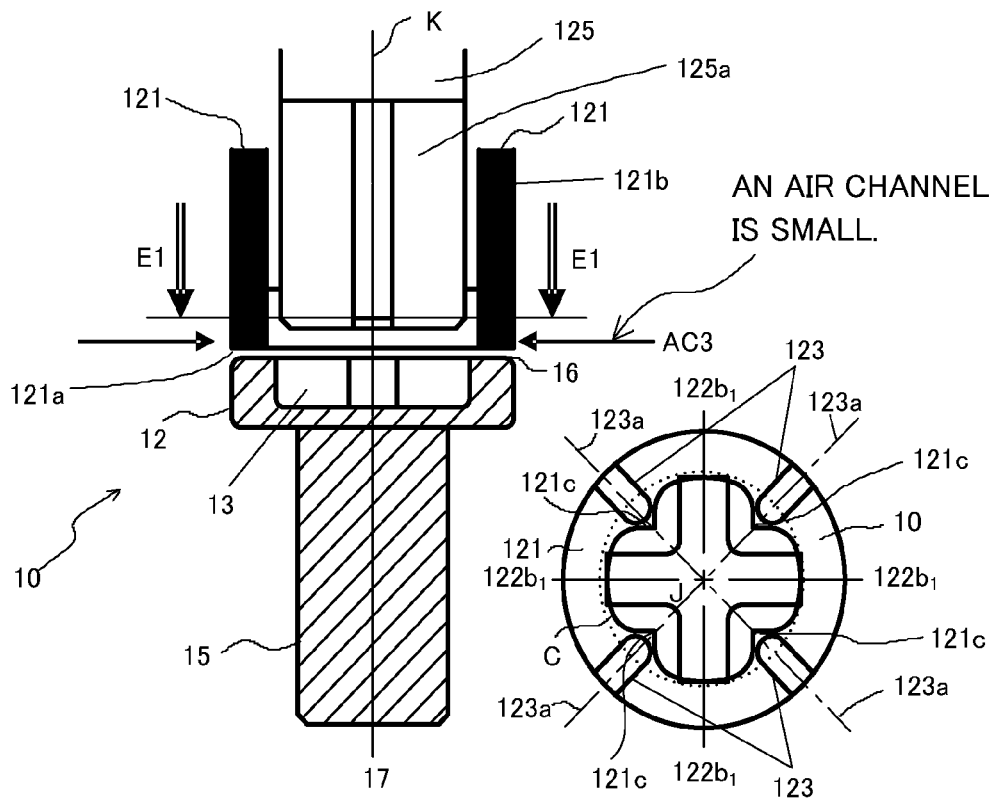
FIGS. 14A and 14B are a longitudinal sectional view and a cross sectional view of a lower portion of a sleeve according to a variation of FIGS. 7A and 7B.
Figures 15A, 15B:
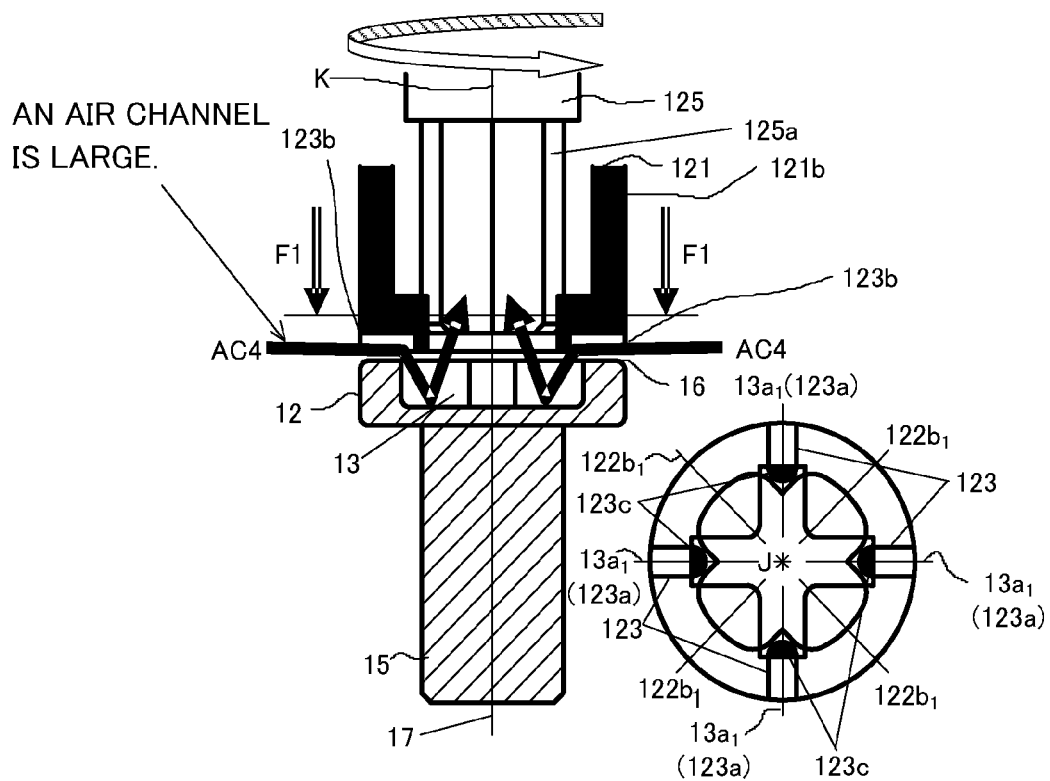
FIGS. 15A and 15B are a longitudinal sectional view and a cross sectional view of a lower portion of a sleeve according to a variation of FIGS. 8A and 8B.

While this embodiment provides one groove 123, the number of grooves 123 is not limited. For instance, as illustrated in FIGS. 14 and 15, four grooves 123 may be provided to the sleeve 121. Here, FIG. 14A is a sectional view of the lower portion of the sleeve 121 when the sleeve 121 and screw 10 are close to each other (at a distance of about 0.2 mm) FIG. 14B is a sectional view of FIG. 14A viewed in an E1-E1 direction. FIG. 14B is a variation of FIG. 7B, and provides four grooves 123 on the bottom surface 121a of the sleeve 121. FIG. 15A is a sectional view of the lower portion of the sleeve 121 located at a position that is rotated clockwise by 45° from FIG. 14A. FIG. 15B is a sectional view of FIG. 15A viewed from an F1-F1 direction. In FIG. 15B, the center axis K of the sleeve 121 (bit 125) is aligned with the center axis 17 of the screw 10 in the vertical direction.

FIGS. 14B and 15B illustrate four grooves 123 and FIG. 7B and 8B illustrate one groove 123 but each groove 123 is identically structured. The groove 123 has the centerline 123a that extends from the center J in the radial direction, and an angle is 45° between the centerline 123a and the centerline 122$b_1$ of the convex 122b that is closest to the centerline 123a. The centerlines 123a are distributed at 90° intervals with respect to the center axis K. When each groove 123 is viewed from the bottom surface 121a, each groove 123 projects inside of the virtual circle C that passes the outermost diameter of the tip 125a of the bit 125 around the center J. This projection may be connected to or disconnected from the recess 13 according to a rotational position of the sleeve 121.

When each projection is disconnected from the recess 13 as illustrated in FIGS. 14A and 14B, the internal pressure of the absorption hole 122 is maintained constant to some extent by the absorption hole 122 and the recess 13 although the bottom surface 121a of the sleeve 121 is slightly spaced from the top surface 16 of the screw 10. On the other hand, when each projection is connected to the recess 13 as illustrated in FIG. 15A and 15B, the internal pressure of the absorption hole 122 lowers since the absorption hole 122, the recess 13, and the groove 123 are connected with one another and the absorption hole 122 is connected to the groove 123 that is open to air via the recess 13.

FIGS. 14A and 14B illustrate that the phase of the dent 13a of each recess 13 accords with the phase of each convex 122b of the sleeve 121 (or each projection 126 of the tip 125a of the bit 125), and the centerline 13$a_1$ accords with the centerline 122$b_1$ (or 125$a_1$). An arrow AC3 illustrated in FIG. 14A represents an air channel. The air channel AC3 is formed in a gap between the bottom surface 121a of the sleeve 121 and the top surface 16 of the screw 10. The flow rate that flows in the air channel AC3 is small as well as the air channel AC1.

FIGS. 15A and 15B illustrate that the phase of (the dent 13a of) the recess 13 shifts by 45° from the phase (of the convex 122b) of the sleeve 121, and the centerlines 13$a_1$ of four dents 13a correspond to the centerlines 123a of the four grooves 123. An arrow AC4 illustrated in FIG. 15A represents an air channel. The air channel AC4 contains a gap between the bottom surface 121a of the sleeve 121 and the top surface 16 of the screw 10, and open ends 123b of the four grooves 123, and the flow rate is large since the external air flows in from the open ends 123b. The flow rate of the air channel AC3 and the flow rate of the air channel AC4 are the pressure to be detected.

A flow rate difference between the air channel AC3 and the air channel AC4 is larger than a flow rate difference between the air channel AC1 and the air channel AC2. Since the peak value of the pressure drop becomes approximately quadruple and the S/N ratio improves, the detection accuracy of the peak position of the pressure drop improves. In addition, the influence of the shape error on the peak position becomes smaller in producing the groove 123 and the recess 13 because the flow rates of the four air channels AC4 are summed up using the four grooves 123 than use of only one groove (due to the averaging effect).

Turning back to FIG. 12 again, the controller 170 next obtains information of the rotational position of the sleeve 121 (bit 125) when the centerline 123a of the groove 123 accords with the centerline 13$a_1$ of the dent 13a of the recess 13 of the screw 10 based on a detection result of the vacuum monitoring detector 146 and a detection result of the rotational position detector 144 (step 1210). When the controller 170 rotates the bit 125 by 360°/n in the step 1208, the controller 170 obtains information of the peak position of the pressure drop (or the rotational angle of the sleeve 121 (bit 125) illustrated in FIG. 8B). The controller 170 selects information of one of four peak positions of the pressure drop when the controller 170 rotates the bit 125 by 360° in the step 1208. In addition, the controller 170 obtains a correction value from the teaching information in the step 1102 (step 1210). The correction amount is an angular difference between the centerline 123a of the groove 123 and the centerline 126a of the bit 125, and thus 45° in this embodiment. As a result, the controller 170 recognizes that the phase of the tip 125a of the bit 125 accords with the phase of the recess 13 of the screw 10 when the rotational position of the bit 125 illustrated in FIG. 8B is shifted to the position by 45°, and obtains information (of the alignment angle) of the rotational angle of the sleeve 121 (bit 125).

Next, the controller 170 rotates the sleeve 121 (bit 125) to the position of the alignment angle acquired in the step 1210 (step 1216). As a result, the phase of the tip 125a of the bit 125 accords with the phase of the recess 13 of the screw 10.

Figure 13:
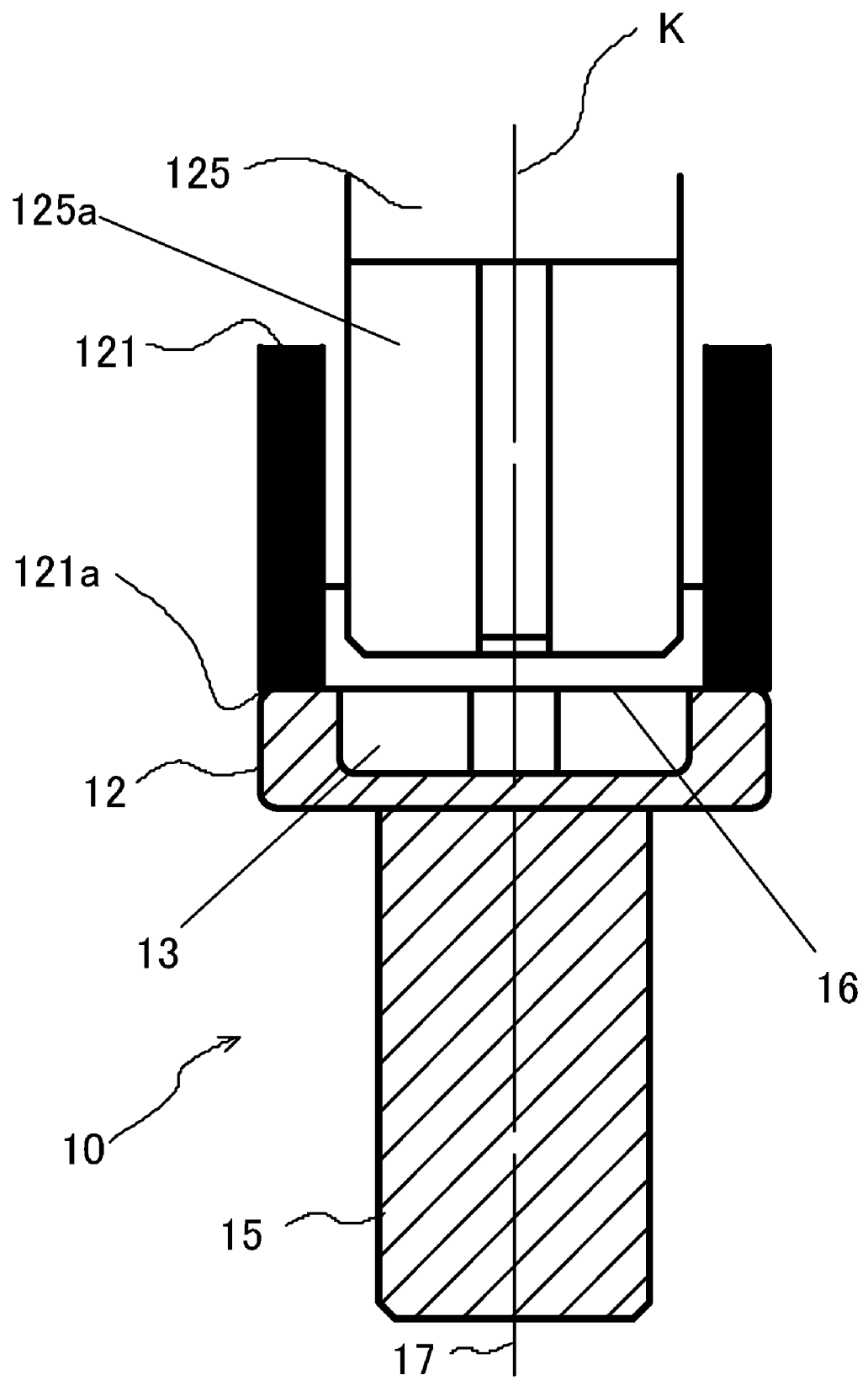
FIG. 13 is a sectional view of the lower portion of the sleeve in the step 1220 illustrated in FIG. 12.

Next, the controller 170 descends the screwdriver 120 (step 1218), engages the tip 125a of the bit 125 with the recess 13 of the screw 10, and absorbs the screw 10 as illustrated in FIG. 13 (step 1220). Here, FIG. 13 is a sectional view of an engagement between the tip 125a of the bit 125 and the recess 13 of the screw 10.

Due to a highly precise alignment, the tip 125a of the bit 125 can be engaged with the recess 13 of the screw 10 with no rotation. As a result, deformations and damages of the tip 125a of the bit 125 and/or the recess 13 of the screw 10, and generations of the abrasion powder can be prevented. Thus, a variety of problems can be solved, including the pollution and the electric short circuit caused by the abrasion powder, a generation of a torque transmission loss, and a short life of the bit 125, and a decrease of the operating rate due to the exchange of the bit 125.

Then, the controller 170 ascends the screwdriver 120 that absorbs the screw 10 via the Z-axis robot 166 of the movement unit 160, and completes picking up of the screw (step 1222). The bit 125 can use the magnetism to pick up the engaged screw 10, as described above.

Turning back to FIG. 10 again, the controller 170 moves the screwdriver 120 to a position above the screw holes of the work W and the part via the X-axis robot 162 and the Y-axis robot 164 of the movement unit 160 (step 1300). A coordinate of the center position of the screw hole is previously input to the movement unit 160. Next, the controller 170 descends the screwdriver 120 via the Z-axis robot 166 of the movement unit 160, and brings the screw 10 into contact with the screw hole (step 1400). Next, the controller 170 fastens the screw 10 into the screw hole via the motor 132 (step 1500).

The fastening in the step 1500 means permanent fastening, but provisional fastening may be performed beforehand if necessary. The provisional fastening means fastening of a predetermined amount without seating of the screw 10. The permanent fastening means complete fastening of the screw for fixation. However, when there are a large number of screws, it is likely that fastening of the screw is difficult or unable because the screw hole of the part shifts from the screw hole of the work. Accordingly, the provisional fastening in which the screw is floated from the seating position is needed so that the attachment position of the part can be adjusted. In this case, all screws are permanently fastened after the provisional fastening is completed. The permanent fastening is completed through seating and torquing-up. The seating means a contact between the seat of the screw and the surface around the screw hole, and the torque-up means fastening with a predetermined torque and fixing of the seated screw.

Next, the controller 170 determines whether the screws 10 have been fastened into all screw holes (step 1600). When the controller 170 determines that the screws 10 have been fastened into all screw holes, the controller 170 completes the screw fastening process and returns to the step 1200 when determining that the screws 10 have not been fastened.

This embodiment detects the origin position of the bit 125 using the detection result of the rotational position detector 140, but another embodiment detects it using the detection result of the rotational position detector 144, as described above.

Figure 16:
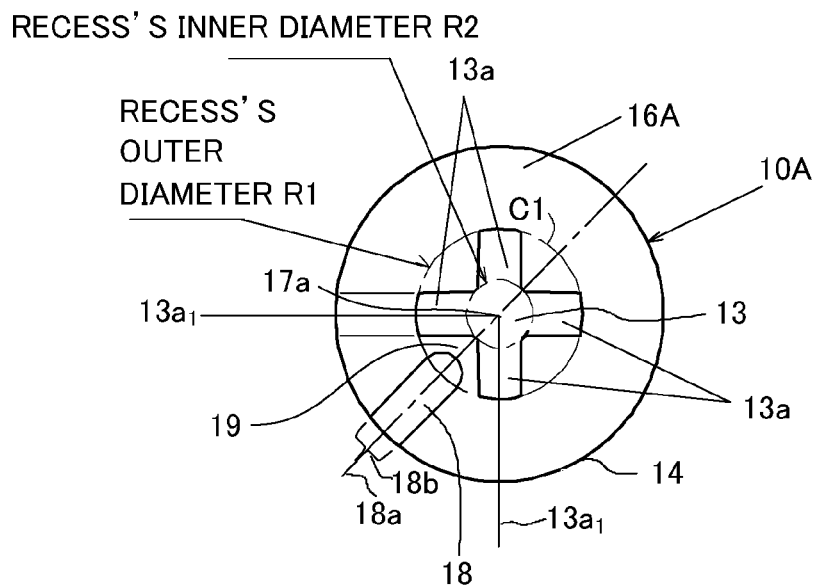
FIG. 16 is an enlarged plane view of a variation of FIG. 2B.

While this embodiment provides the groove 123 to the bottom surface 121a of the sleeve 121, the pressure fluctuation unit is not limited to this embodiment. For instance, as illustrated in FIG. 16, a groove 18 may be provided in a screw 10A. The screw 10A is different from the screw 10 in that the screw 10A has the groove 18. In this case, it is unnecessary to provide the groove 123 on the bottom surface 121a of the sleeve 121. The groove 18 fluctuates the pressure in the absorption hole according to the rotational position of the sleeve when the bottom surface of the sleeve is located close to the top surface 16A of the screw 10A in a noncontact manner. Here, FIG. 16 is an enlarged plan view of the screw 10A.

The groove 18 is separated from the recess 13, and the recess 13 and the groove 18 are separated by the diaphragm 19. The groove 18 is opened to air on the top surface 16A of the screw 10A and a side surface 14 of the screw 10A. The groove 18 has a U-shaped contour when viewed from the top surface side of the screw 10A, and has a shape that combines a quarter sphere with a cylinder. The groove 18 has a centerline 18a that extends from the center J in the radial direction, and an angle is 45° between the centerline 18a and the centerline 13a1 of the dent 13a that is closest to the centerline 18a. The centerline 18a means a line with respect to which the groove 18 is in line symmetry. The groove 18 has an open end 18b connected to the side surface 14 of the screw head. The size of the open end 18b is not limited.

The groove 18 projects inside of a virtual circle C1 that has an outer diameter R1 of the recess 13 around the center 17a. In this embodiment, this projection is the above quarter sphere. This projection is connected to or disconnected from the convex of the sleeve according to the rotational position of the sleeve. Thus, the groove 18 has the same function as that of the groove 123.

According to the suction system of this embodiment, when the bit 125 is attempted to rotate with the sleeve 121, the suction plug 150 is rotated since the suction plug 150 is fixed onto the sleeve 121. However, it is difficult to rotate the attraction system since the vacuum drawing tube 152 is attached to the suction plug 150. Accordingly, the lower portion of the screwdriver 120 may be modified to the structure illustrated in FIG. 17.

Figure 17:
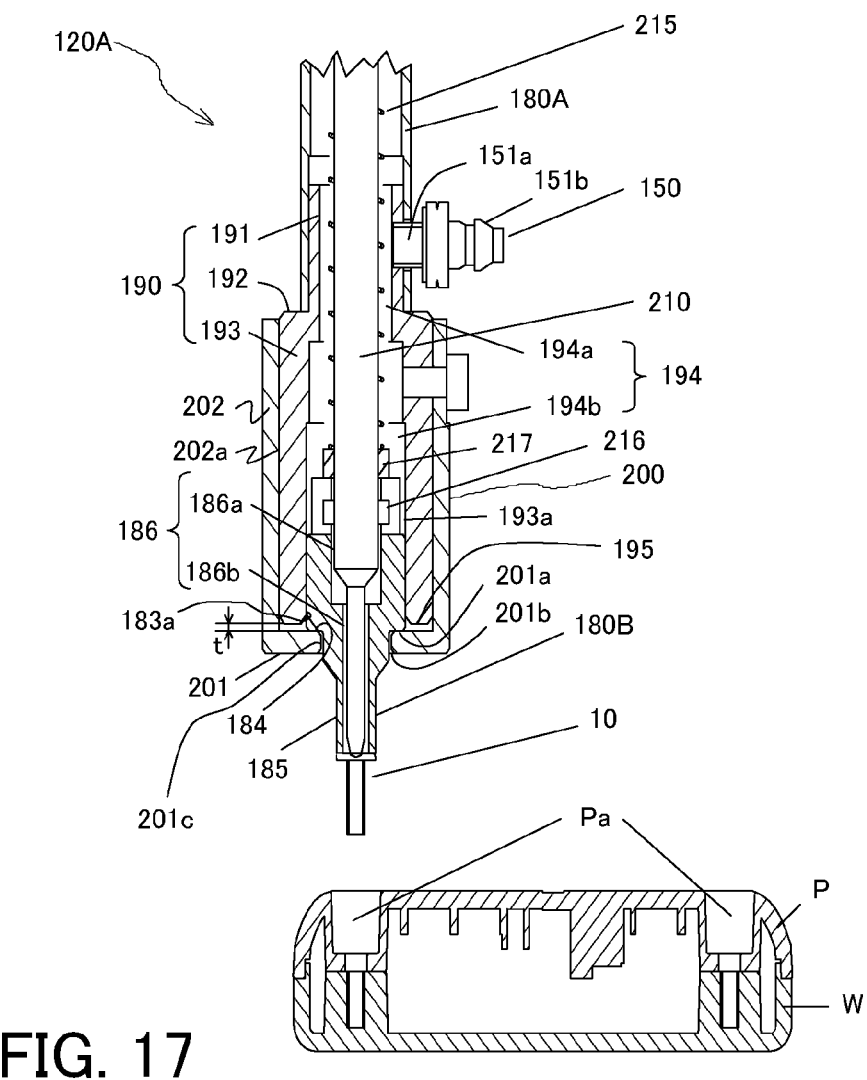
FIG. 17 is a partially enlarged sectional view of a lower portion according to a variation of the screwdriver illustrated in FIG. 3.

In FIG. 17, a work W is a lower case (base) of a housing of a cellular phone, and the screw fastener 100 screws an upper case (cover) P of the housing that is a part of the cellular phone onto the lower case. The upper case P has a plurality of bores Pa and the upper case P is screwed onto the lower case by fastening the screws 10 in the bores Pa.

Figure 18:
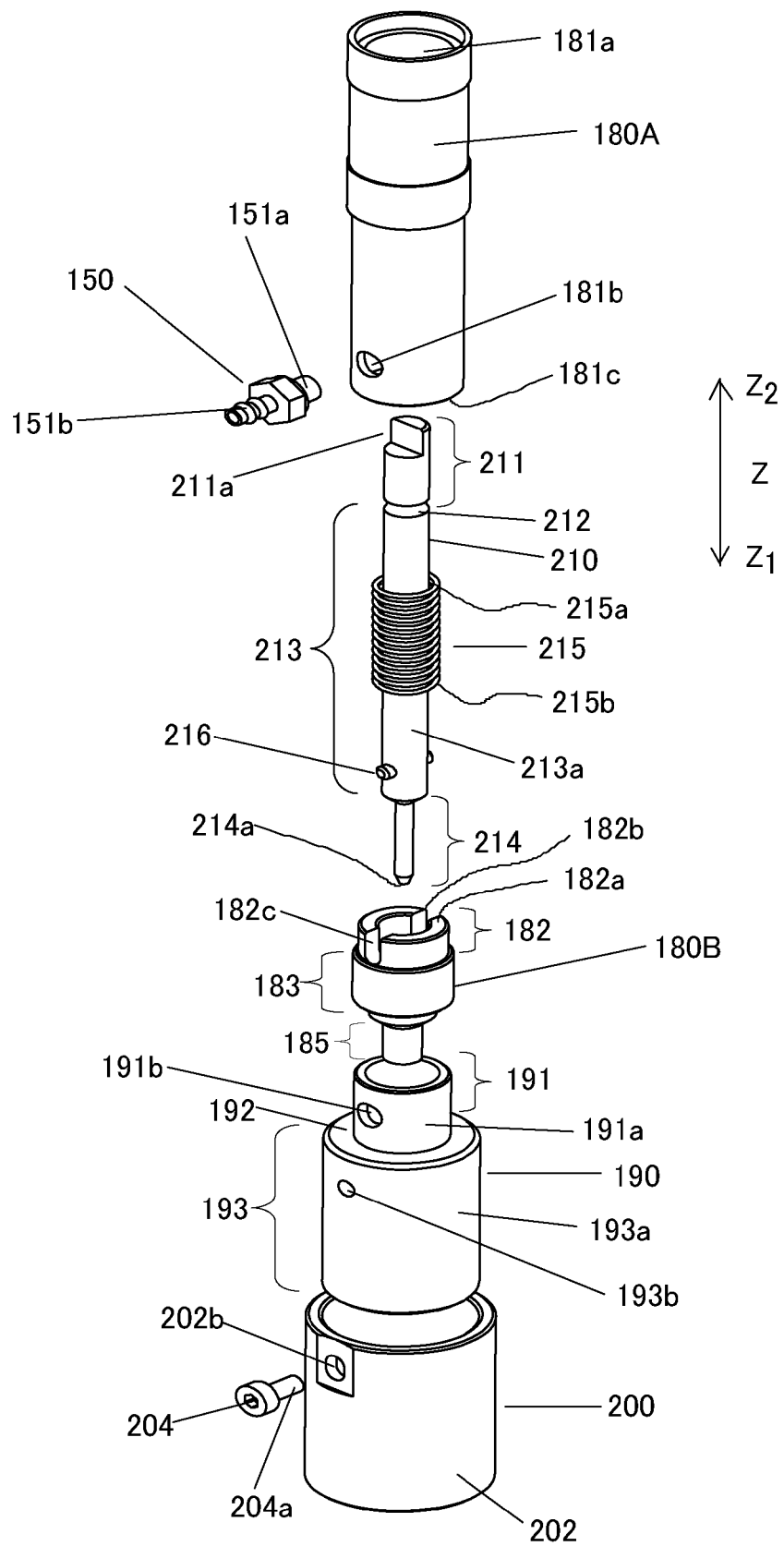
FIG. 18 is an exploded perspective view of essential components illustrated in FIG. 17.

FIG. 17 is a partially enlarged sectional view of the lower portion of the screwdriver 120A. FIG. 18 is an exploded perspective view of the essential components illustrated in FIG. 17. Referring to FIGS. 17 and 18, the lower portion of the screwdriver 120A of this embodiment includes sleeves 180A, 180B, a sleeve holder 190, a cover 200, a bit 210, and a suction plug 150. The sleeve 180B, the sleeve holder 190, the cover 200, and the bit 210 are aligned with the same axis.

The sleeve 180A is a hollow, thin cylindrical member, and includes a central perforation hole 181a that extends in the Z-axis direction, a side perforation hole 181b that extends in the radial direction, and an annular bottom surface 181c. The Z-axis direction is a direction that accords with a longitudinal direction of the bit 210. Since the sleeve 180A and the sleeve 180B are not integrally formed, the sleeve 180A does not rotate even when the sleeve 180B is rotated with the bit 210. The sleeve 180A and the suction plug 150 are formed as one unit.

The sleeve 180A accommodates a part of a base 213 of the bit 210 in the central perforation hole 181a. The suction plug 150 is installed in the side perforation hole 181b at the lower portion of the sleeve 180A. The bottom surface 181c is placed on a flange 192 of the sleeve holder 190.

The sleeve 180B includes an engagement member 182, a central member 183, a flange 184, and a tip 185, and is accommodated in the sleeve holder 190 so that the sleeve 180B can move relative to the sleeve holder 190. In other words, the sleeve 180B can move in the Z-axis direction and rotate around the Z axis in the sleeve holder 190.

The engagement member 182 has a hollow, cylindrical shape, and is located at the uppermost position in the sleeve 180B. The engagement member 182 includes a top end surface 182a orthogonal to the Z axis, and a pair of grooves 182b having the same shape. The top end surface 182a contacts a compression spring 215 directly or via a washer 217. A projection 216 is inserted into each groove 182b, and each groove 182b extends in the Z-axis direction. A direction in which the groove 182b extends is not limited, but if the groove 182b extends in the Z-axis direction, both clockwise and counter-clockwise rotations of the bit 210 are likely to transmit to the sleeve 180B. The number of grooves 182b and the interval between the grooves 182b correspond to the number of projections 216 and the interval between the projections 216. The width of groove 182b is slightly wider than a width (diameter) of the projection 216. As the bit 210 rotates, the projection 216 contacts and compresses the contour surface 182c that defines the groove 182b. As a result, the sleeve 180B rotates with the bit 210.

The central member 183 contacts a side surface 193a of a second cylinder 193 of the sleeve holder 190 via an outer side surface 183a. The outer diameter of the central member 183 is approximately equal to the inner diameter of the second cylinder 193 of the sleeve holder 190 and engaged with the second cylinder 193 with a predetermined clearance. The outer diameter of the central member 183 is larger than the inner diameter of a first cylinder 191 of the sleeve holder 190. Thus, while FIG. 17 illustrates that the sleeve 180B can be inserted through the first cylinder 191 side but actually it is inserted into the sleeve holder 190 from the bottom side (second cylinder 193 side) of the sleeve holder 190.

The flange 184 is pressed against an inner surface 201a of a bottom 201 (near a perforation hole 201b) of the cover 200 by the compression spring 215. The pressure is set slightly larger than the force moving the sleeve 180B in the Z2 direction in the decompression time of the absorption hole 186. Thereby, a Z-axis position of the sleeve 180B is determined The tip 185 has an absorption hole 186 for the vacuum absorption of a part of the top surface 16 of the screw 10. The adsorption hole 186 is a central perforation hole of the sleeve 180B, and has two kinds of cylinders having different diameters. However, as described above, the base 213 and the operation part 214 may have the same diameter and in that case the absorption hole 186 has a cylindrical shape having the same diameter. The absorption hole 186 has a first hole 186a that can accommodate the base 213, and a second hole 186b that can accommodate the operation part 214 but cannot accommodate the base 213. In this embodiment, the outer shape of the tip 185 and the diameter of the second hole 186b are smaller than the diameter of the screw head 12 of the screw 10 engageable with the bit 210.

The sleeve 180B is made of anti-static resin. Resin provides a smooth rotation of the sleeve 180 relative to the sleeve holder 190 and an anti-static material prevents a damage of the sleeve 180B due to electric charges.

The sleeve holder 190 has a convex section shape, and is made of stainless steel in this embodiment. The sleeve holder 190 includes a first cylinder 191, a flange 192, a second cylinder 193, and a central perforation hole 194.

The first cylinder 191 is inserted into the sleeve 180A, and has an outer diameter that is approximately equal to an internal diameter of the sleeve 180A, and contacts the inner surface of the sleeve 180A. The first cylinder 191 has a hollow cylindrical shape, and a side perforation hole 191b on the side surface 191a which extends in the radial direction, and the threaded portion 151a of the suction plug 150 is attached to the side perforation hole 191b through the side perforation hole 181b of the sleeve 180A.

The flange 192 contacts and positions the bottom surface 181c of the sleeve 180A.

The diameter of the second cylinder 193 is larger than that of the first cylinder 191. The second cylinder 193 contacts the inner surface 202a of the side surface 202 of the cover 200, and the cover 200 is inserted. The diameter of the second cylinder 193 is approximately equal to the diameter of the central member 183 of the sleeve 180B.

The second cylinder 193 has a hollow cylindrical shape, and has a side perforation hole 193b that extends in the radial direction at an upper portion of the side surface 193a. The side perforation hole 193b is a screw hole aligned with the side perforation hole 202b of the side surface 202 of the cover 200. The side perforation hole 202b is an oval that is long in the Z-axis direction. A threaded portion 204a of the screw 204 is inserted into the side perforation holes 193b and 202b, and the cover 200 is fixed onto the sleeve holder 190. The second cylinder 193 accommodates the sleeve 180B so that the sleeve 180B can be moved in the Z-axis direction and rotated around the Z axis.

The central perforation hole 194 has a convex section shape, and is connected to the absorption hole 186 of the sleeve 180B. The central perforation hole 194 includes a first hole 194a in the first cylinder 191, and a second hole 194b in the second cylinder 193. The first hole 194a and the second hole 194b have cylindrical shapes, and the diameter of the second hole 194b is larger than the diameter of the first hole 194a. The first hole 194a accommodates the bit 210 and the compression spring 215. The second hole 194b accommodates the bit 210, the compression spring 215, the washer 217, and the sleeve 180B.

The cover 200 has a hollow, cylindrical shape that has an open top surface, and includes a bottom 201 and a side surface 202.

The bottom 201 contacts the flange 184 of the sleeve 180B in the internal surface 201a. A central perforation hole 201b is formed at the center of the bottom 201. Since an outer side surface 183a of the central member 183 of the sleeve 180B and the side surface 193a of the second cylinder 193 have approximately the same diameter, the inflow of the air at the boundary is reduced so as to maintain the decompression environment.

The side perforation hole 202b is formed in the radial direction at the upper portion of the side surface 202. The threaded portion 204a of the screw 204 is inserted into the side perforation holes 193b and 202a, and thereby the cover 200 is fixed onto the sleeve holder 190 in the Z-axis direction. The side perforation hole 202b is formed as an oval that is long in the Z-axis direction. Thereby, the Z-axis position of the sleeve holder 190 of the cover 200 is adjustable. The oval, side perforation hole 202b and the screw 204 are used to adjust the Z-axis position of the cover 200 relative to the sleeve holder 190, and forms a fixation unit configured to fix the cover 200 and the sleeve holder 190. An adjustment of the Z-axis position of the cover 200 relative to the sleeve holder 190 means that the Z-axis position of the sleeve 180B is adjustable in FIG. 17.

The bit 210 is a rod member that extends in the Z-axis direction, and includes an end 211, a neck 212, a base 213, and an operation part 214.

The end 211 has a semicircular engagement part 211a engageable with a semicircular end (not illustrated) of the shaft 128 on the top, and an engagement of them forms a cylinder. Thereby, a driving force of a driving system is transmitted as a rotational driving power around the Z axis to the bit 210. The shaft 128 and the bit 210 may be integrated with each other.

The neck 212 is a narrow part formed between the end 211 and the base 213, and binds the bit 210 and releases the bit 210 in the Z-axis direction by inserting a steel ball (engagement member) (not illustrated) into the neck 212 and ejecting the steel ball from the neck 212.

The base 213 is coupled with the bottom of the end 211 via the neck 212. The compression spring 215 is provided around the base 213, and the lower portion of the side surface 213a has a pair of projections 216.

The compression spring 215 is latched by an engagement member (not illustrated) fixed on the sleeve 180A at one end 215a, and by the top end surface 182a of the sleeve 180B at the other end 215b via the washer 217. It is optional to provide the washer 217. Thereby, the compression spring 215 forces the sleeve 180B in the Z1 direction. The compression spring 215 presses the sleeve 180B against the internal surface 201a of the bottom 201 of the cover 200. Thereby, at the decompression time of the absorption hole 186, the position can be maintained.

A pair of projections 216 is provided to the side surface 213a of the base 213. Each projection 216 is engaged with the groove 182b of the sleeve 180B, and transmits to the sleeve 180B the driving force of the motor 132 which has been transmitted to the end 211. This embodiment makes perforation holes in the side surface 213a of the base 213 in a direction perpendicular to the Z-axis direction, and forms the projections 216 by inserting a pin into the perforation holes. However, the structure of the projections 216 is not limited to this embodiment.

The operation part 214 has a tip 214a at the top which is engageable with the recess 13 of the screw 10. A shape of the tip 214a corresponds to the shape of the recess 13. When the tip 214a is engaged with the recess 13 of the screw 10 and rotates together, the bit 210 can fasten the screw 10 in the work W using the driving force applied by the motor 132.

Figure 10:
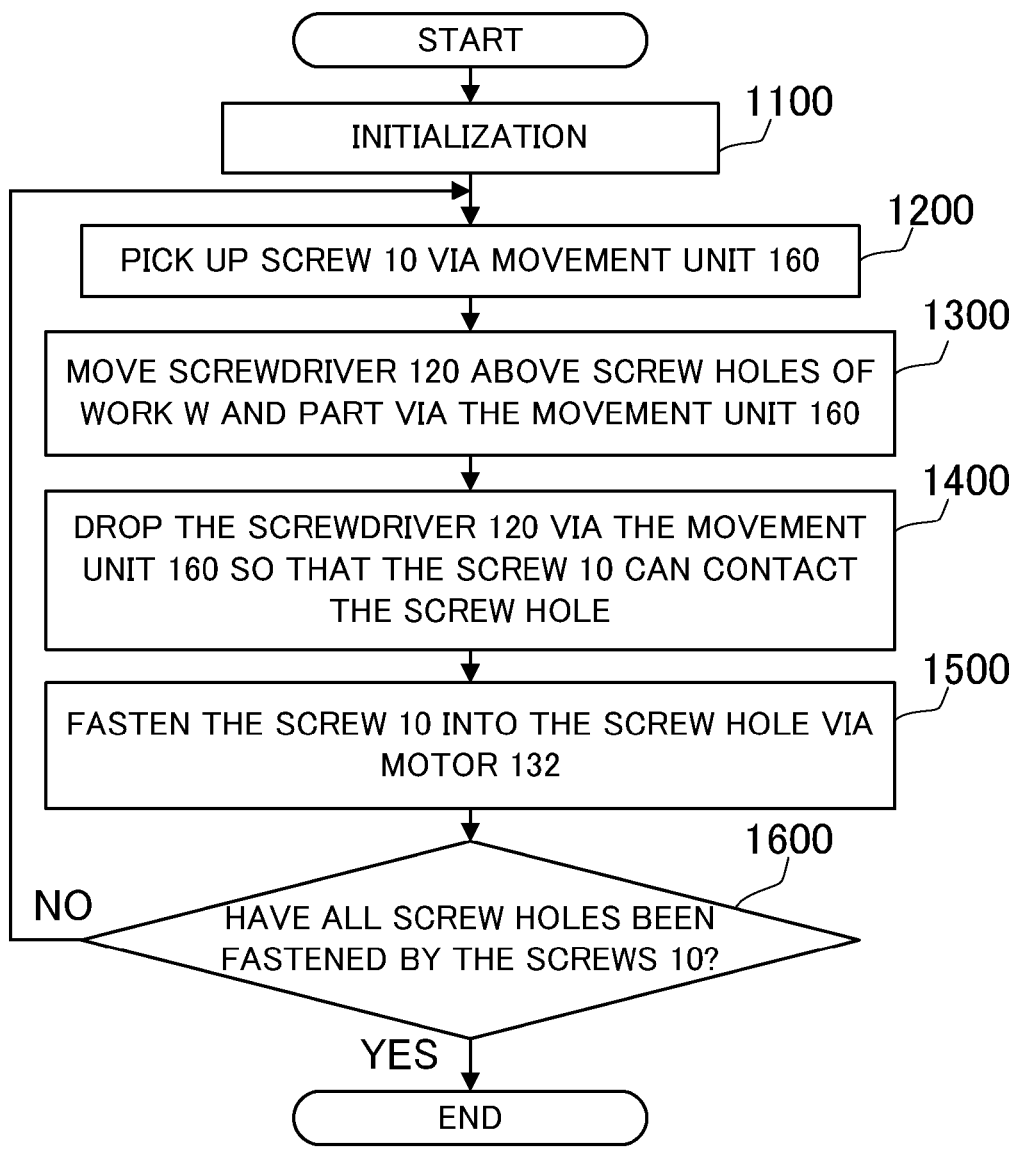
FIG. 10 is a flowchart for explaining an operation of the screw fastener illustrated in FIG. 1.

The screwdriver 120A inserts the screw 10 into the bore Pa, as illustrated in FIG. 19A in the step 1400 illustrated in FIG. 10. Subsequently, as illustrated in FIG. 19B, the screw 10 is fastened into the screw hole in the bore Pa via the motor 132 (step 1500). In the step 1500, the bit 210 and sleeve 180A rotate with the screw 10, and the sleeve 180B, the sleeve holder 190, and the cover 200 are maintained stationary. Since suction plug 150 stops, a structure in which the tube 152 that is required to stand still may be used.

Figure 21:
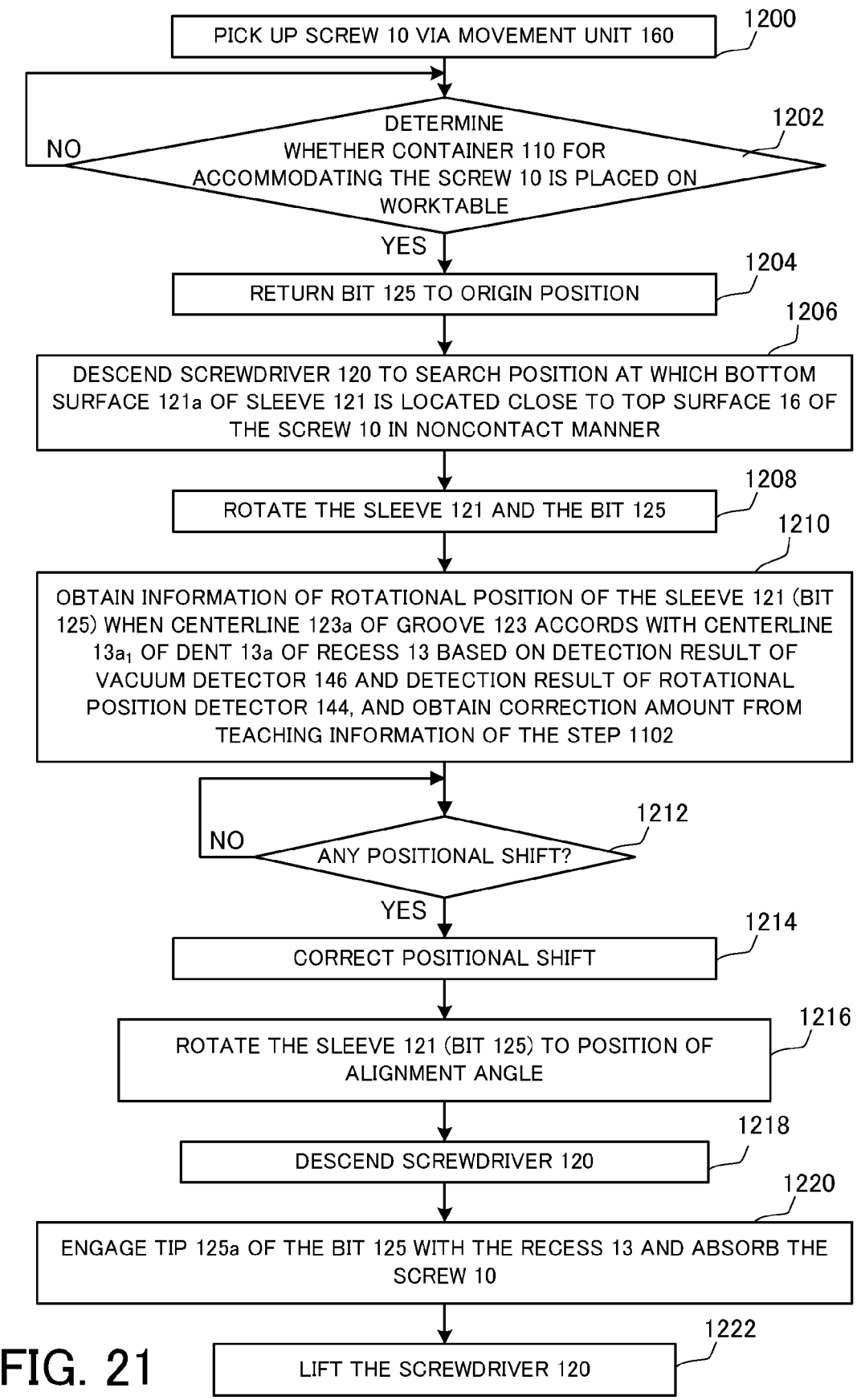
FIG. 21 is a variation of the flowchart illustrated in FIG. 12.
Figure 22:
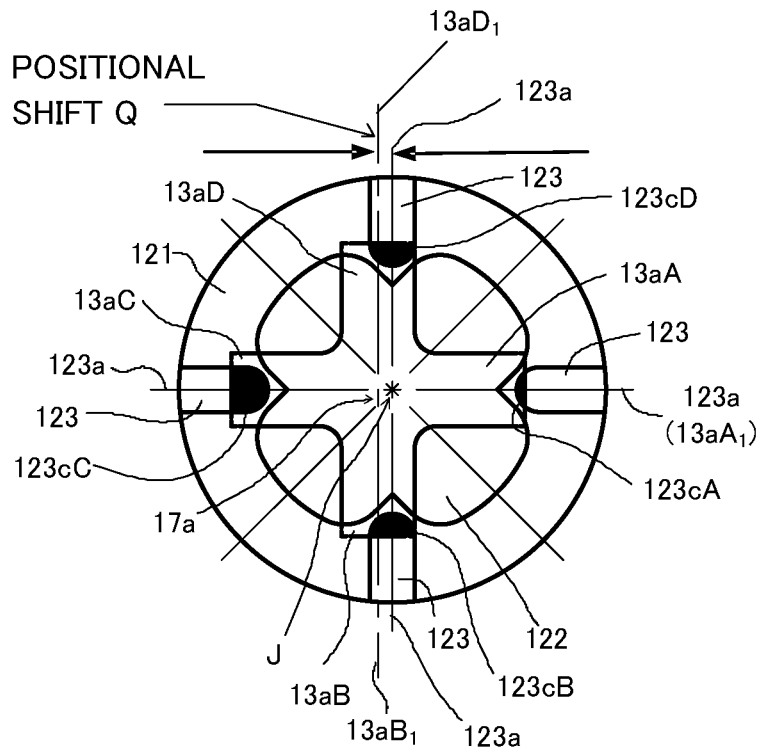
FIG. 22 is a plane view illustrating a positional shift between a groove and a dent of a recess when there is a positional shift between a center axis of the recess of the screw and the center axis of the sleeve (bit).
Figure 23:
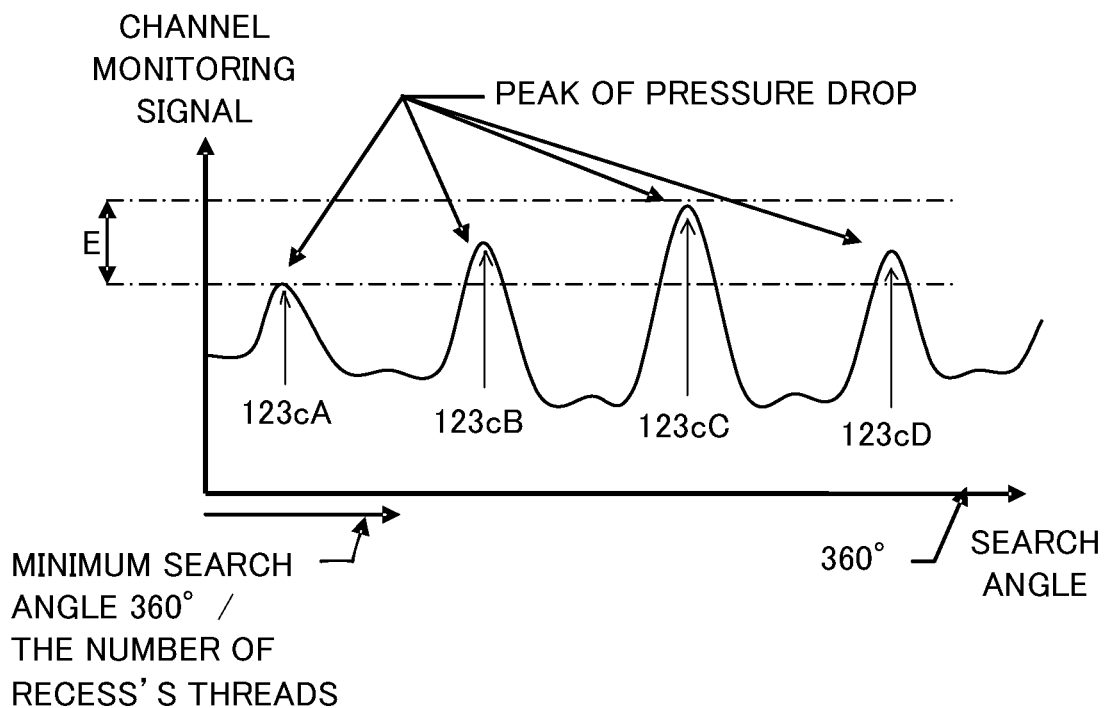
FIG. 23 is a graph illustrating a relationship between the rotational angle of the sleeve (bit) illustrated in FIG. 22 and an output of the vacuum monitoring detector.

Referring now to FIGS. 20 to 23, a variation of the flowchart illustrated in FIG. 12 will be described. FIG. 20 is a variation of the flowchart illustrated in FIG. 11, and those reference numerals in FIG. 20 which are the same reference numerals in FIG. 11 will be designated by the same reference numerals, and a description thereof will be omitted. FIG. 20 is different from the flowchart illustrated in FIG. 12 in that FIG. 20 has the step 1106. FIG. 21 is a variation of the flowchart illustrated in FIG. 12, and those reference numerals in FIG. 21 which are the same reference numerals in FIG. 12 will be designated by the same reference numerals, and a description thereof will be omitted. FIG. 21 is different from the flowchart illustrated in FIG. 12 in that FIG. 21 has the steps 1212 and 1214. FIG. 22 is a plane view that illustrates a positional shift between the groove 123 and the dent 13a of the recess 13 when there is a positional shift between the center axis 17 of the recess 13 of the screw 10 and the center axis K of the sleeve 121 (bit 125). FIG. 23 is a graph illustrating a relationship between a rotational angle of the sleeve 121 (bit 125) and an output of the vacuum monitoring detector 146.

Assume that the center axis 17 of the recess 13 of the screw 10 (center 17a) shifts from the center axis K of the sleeve 121 (bit 125) (center J) as illustrated in FIG. 22, and the recess 13 has a plurality of dents 13aA to 13aD. For simple description, the center 17a shifts from the center J in the lateral direction (horizontal direction) in FIG. 22, and Q denotes a positional shift. In addition, the dents 13aA to 13aD are arranged clockwise illustrated in FIG. 22. In FIG. 22, the groove 123 rotates with the sleeve 121, and the centerline 123a of the groove 123 becomes parallel to the centerline 13a1 of each dent 13a for each 90°. While FIG. 22 illustrates four grooves 123, this figure actually illustrates that only one groove 123 rotates by 360°.

An overlap area 123cA between the groove 123 and the dent 13aA when the centerline 123a of the groove 123 accords with the centerline 13aA1 of the dent 13aA is smaller than an overlap area 123cC between the groove 123 and the dent 13aC when the centerline 123a of the groove 123 accords with the centerline 13aC1 of the dent 13aC. An overlap area 123cB between the groove 123 and the dent 13aB when the centerline 123a of the groove 123 accords with the centerline 13aB1 of the dent 13aB is equal to an overlap area 123cD between the groove 123 and the dent 13aD when the centerline 123a of the groove 123 accords with the centerline 13aD1 of the dent 13aD.

Initially, it is premised that the controller 170 stores the teaching of a relationship between a positional shift amount and the pressure or the flow rate detected by the vacuum monitoring detector 146 when an accordance between the center 17 and the center J (or the ideal state when the positional shift amount is 0) destroys (step 1106 in FIG. 20). Thereby, the controller 170 can obtain the detection result of the vacuum monitoring detector 146 and can convert it into a positional shift.

FIG. 23 illustrates four peaks of the pressure drop detected by the vacuum monitoring detector 146 corresponding to the overlap areas 123cA to 123cD. The pressure drop corresponding to the overlap areas 123cB and 123cD have the same peak values. The pressure drop corresponding to the overlap area 123cA has the lowest peak value, and the pressure drop corresponding to the overlap area 123cD has the highest peak value.

When the controller 170 obtains information illustrated in FIG. 23, the controller 170 recognizes that there is no positional shift between the center 17a and the center J in the longitudinal direction (perpendicular direction), since the pressure drops corresponding to the overlap areas 123cB and 123cD have equal peak values (or from the detection result of the vacuum monitoring detector 146 and the teaching in step 1106) (step 1212 in FIG. 21). In addition, the controller 170 recognizes that there is a positional shift amount Q due to a difference E between the peak value of the pressure drop corresponding to the overlap area 123cA and the peak value of the pressure drop corresponding to the overlap area 123cC (step 1212 in FIG. 21). The controller 170 obtains the positional shift amount Q from the detection result of the vacuum monitoring detector 146 corresponding to the overlap area 123cA and the teaching of the step 1106. Alternatively, the controller 170 may obtain the positional shift amount Q from the detection result of the vacuum monitoring detector 146 corresponding to the overlap area 123cC and the teaching of the step 1106. Moreover, the controller 170 may obtain the positional shift amount Q by dividing by 2 a sum of the positional shift amount Q from the detection result of the vacuum monitoring detector 146 corresponding to the overlap area 123cA and the teaching of the step 1106, and the positional shift amount Q from the detection result of the vacuum monitoring detector 146 corresponding to the overlap area 123cC and the teaching of the step 1106.

Next, the controller 170 drives the movement unit 160 so as to make zero (or reduce) this positional shift amount Q (step 1214). As a result, the center 17a accords with the center J.

The number of grooves 123 is one in this embodiment, and the controller 170 rotates the sleeve 121 and the bit 125 by 360° in the step 1212. When a plurality of grooves (such as four grooves 123) is used, the vacuum monitoring detector 146 is likely to detect a total of shifts of the respective grooves in FIG. 23 as each peak, each peak amount becomes equal, and a positional shift amount between the center axis 17 and K may not be recognized.

According to this embodiment, the center 17a and the center J shift by the positional shift amount Q in the lateral direction illustrated in FIG. 22, but when they shift in the longitudinal direction, the controller 170 recognizes the positional shift amount in the longitudinal direction from a difference between the peak value of the pressure drop corresponding to the overlap area 123cB and the peak value of the pressure drop corresponding to the overlap area 123cD.

Figure 24:
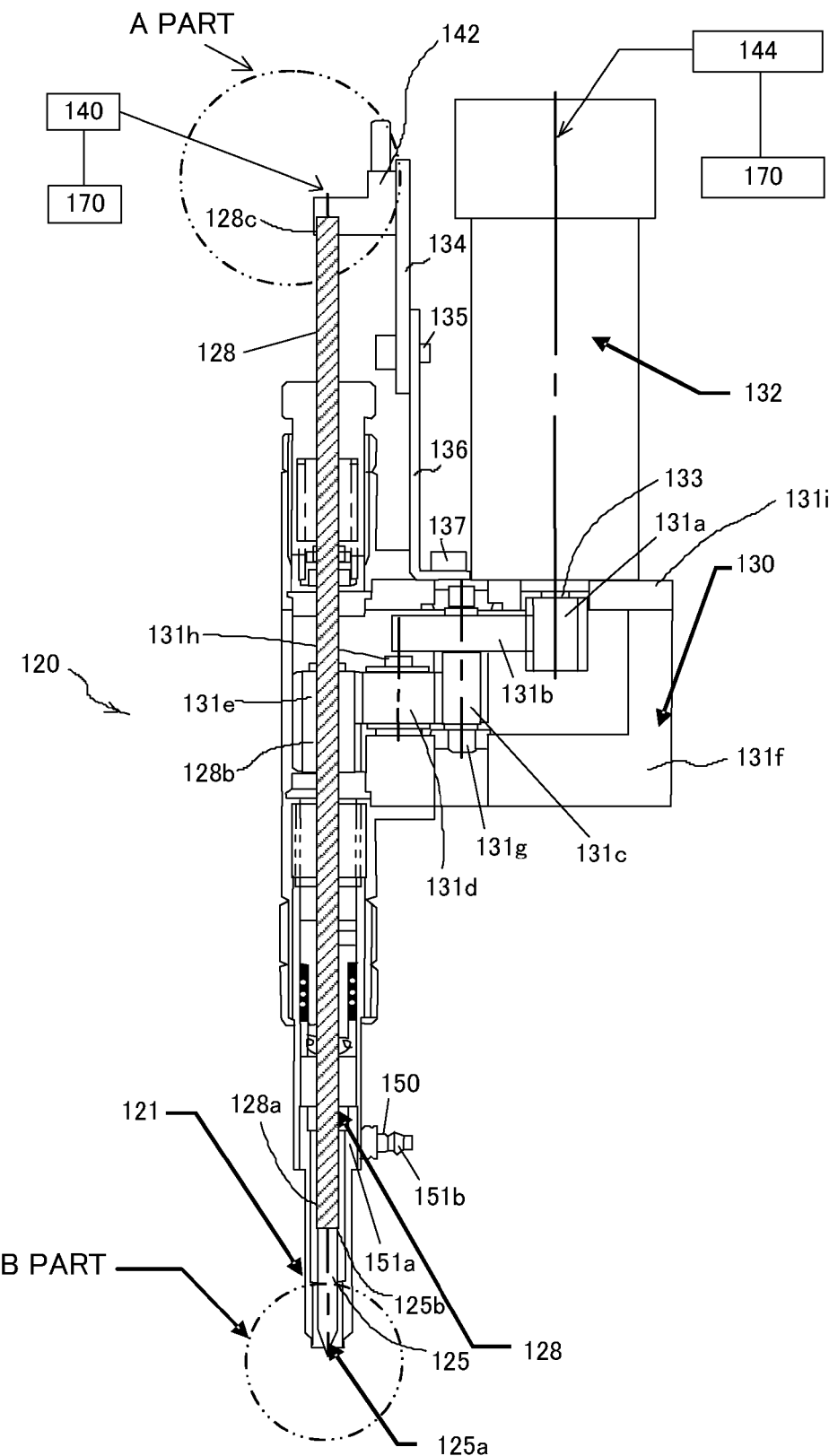
FIG. 24 is a sectional view of a screwdriver according to a variation of the structure illustrated in FIG. 3.

Referring now to FIGS. 24 to 28, a description will be given of another structure used to achieve the flowcharts illustrated in FIGS. 20 and 21. FIG. 24 is a sectional view of a screwdriver 120B according to a variation of the structure illustrated in FIG. 3. The screwdriver 120B illustrated in FIG. 24 is different from the screwdriver 120 in that the screwdriver 120B has no vacuum monitoring detector 146 and has an optical sensor 148.

Figure 25A:
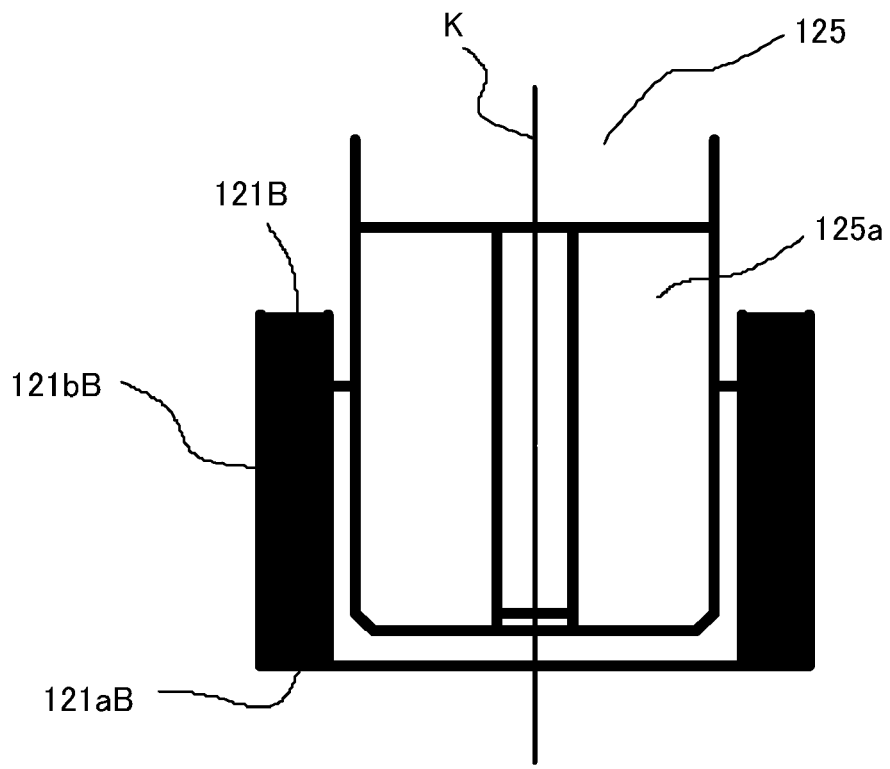
FIGS. 25A and 25B are a longitudinal sectional view and a cross sectional view of the lower portion of the sleeve according to a variation of FIG. 4.
Figure 25B:
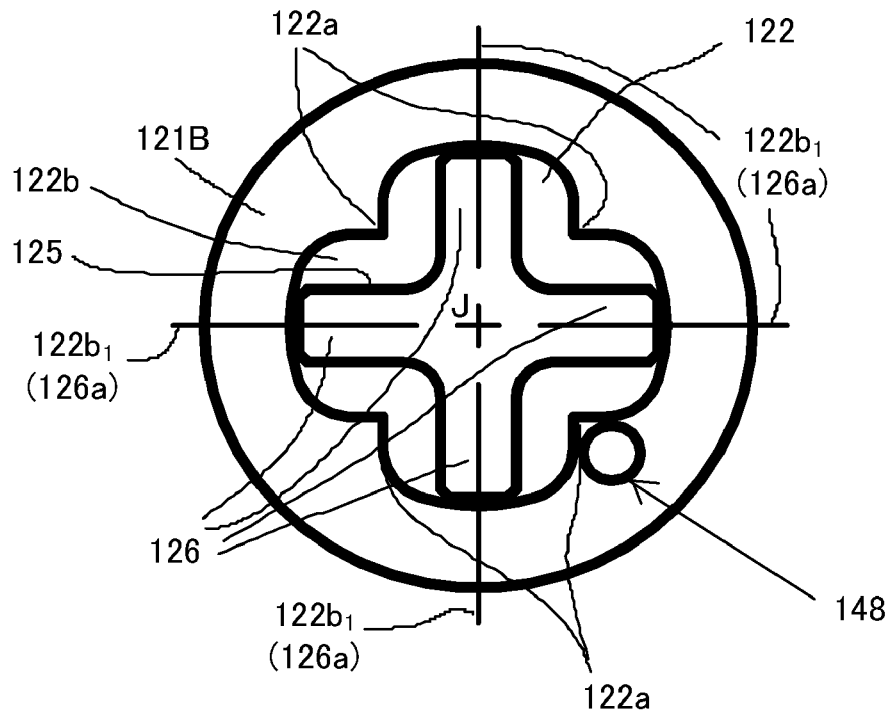
Figure 26A:
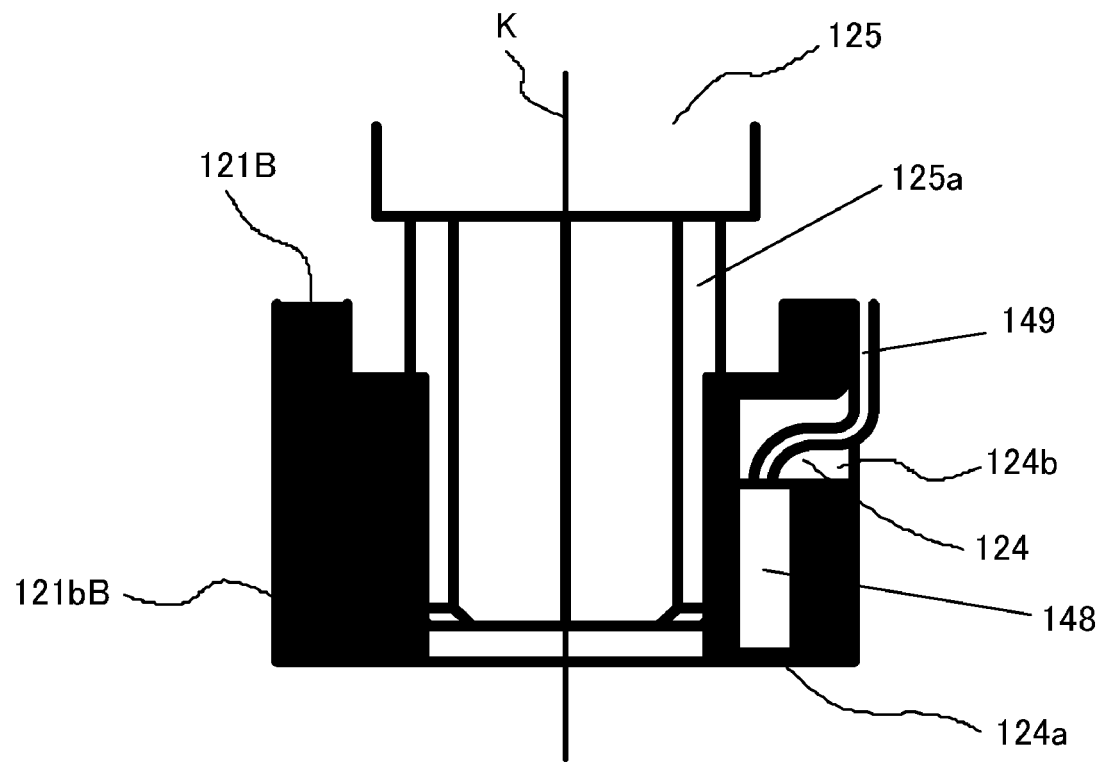
FIGS. 26A and 26B are a longitudinal sectional view and a cross sectional view of the lower portion of the sleeve according to a variation of FIG. 5.
Figure 26B:
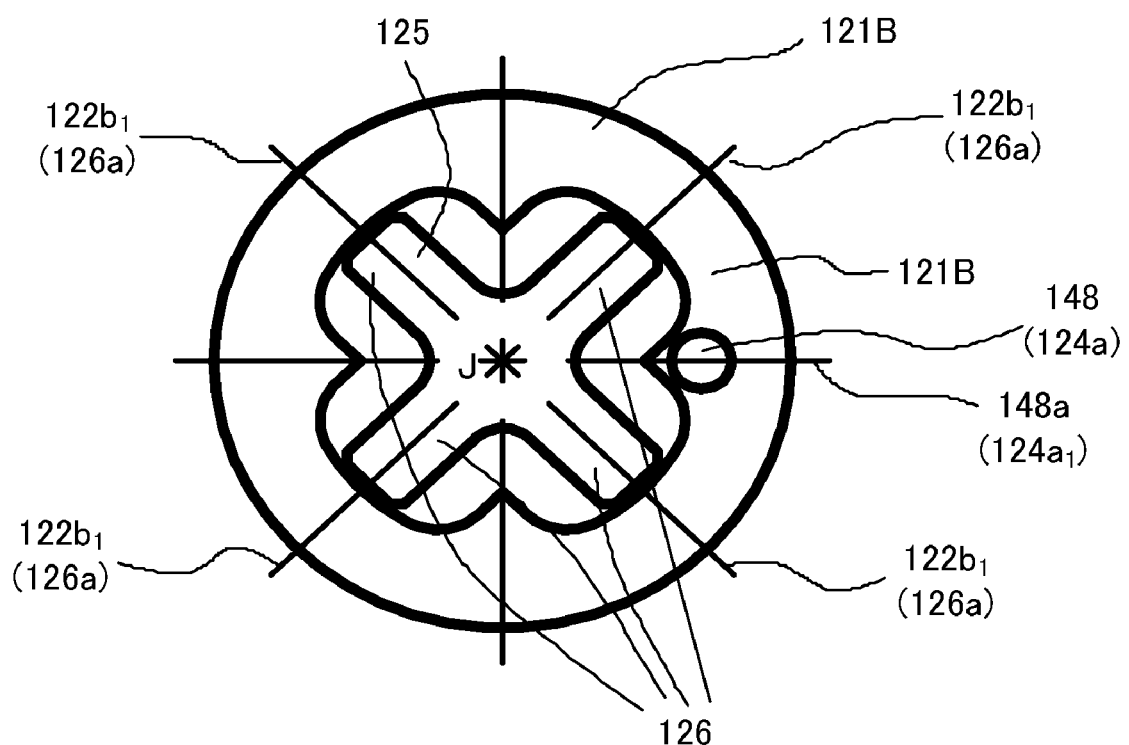

FIG. 25A is an enlarged sectional view of a lower portion of a sleeve 121B. FIG. 25B is a bottom view of the sleeve 121B illustrated in FIG. 25A. FIG. 26A is an enlarged sectional view of the lower portion of the sleeve 121B that has rotated clockwise by 45° from the rotational position illustrated in FIG. 25A. FIG. 26B is a bottom view of the sleeve 121B illustrated in FIG. 26A.

The sleeve 121B has an approximately hollow, cylindrical shape, and includes an absorption hole (hollow part) 122 that can absorb the top surface 16 of the screw 10, and a container 124 of the optical sensor 148 as illustrated in FIGS. 25B and 26B. The adsorption hole 122 is similar to the absorption hole 122 illustrated in FIGS. 4 and 5. The sleeve 121B has no groove 123 differently from the sleeve 121. Instead, the container 124 of the optical sensor 148 is provided.

The container 124 accommodates the optical sensor 148, as illustrated in FIG. 26A, has an L-shaped section, and includes a bottom open end 124a and a side open end 124b. The bottom open end 124a has a circular opening on a bottom surface 121aB of the sleeve 121B, and transmits the light from the optical sensor 148. The bottom open end 124a is smaller than the optical sensor 148 so that the optical sensor 148 cannot drop from the bottom open end 124a. The side open end 124b opens on the cylindrical side surface 121bB of the sleeve 121B, and allows the cable 149 connected to the optical sensor 148 to pass through it. The size of the side open end 124b is not limited.

Figures 27A, 27B:
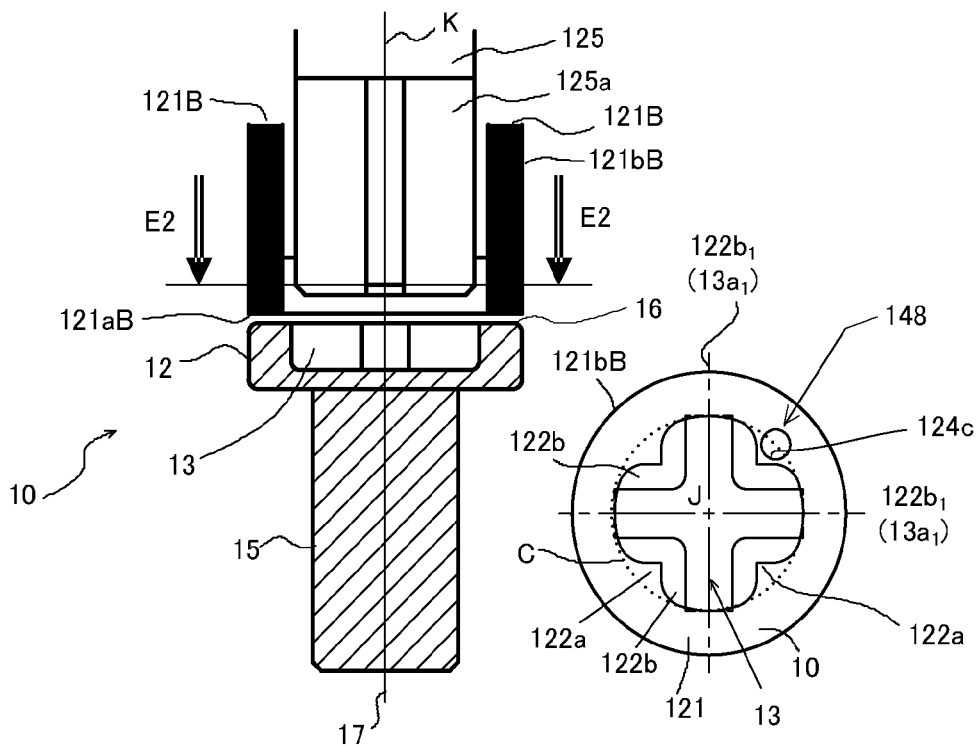
FIGS. 27A and 27B are a longitudinal sectional view and a cross sectional view of the lower portion of the sleeve according to a variation of FIG. 7.
Figures 28A, 28B:
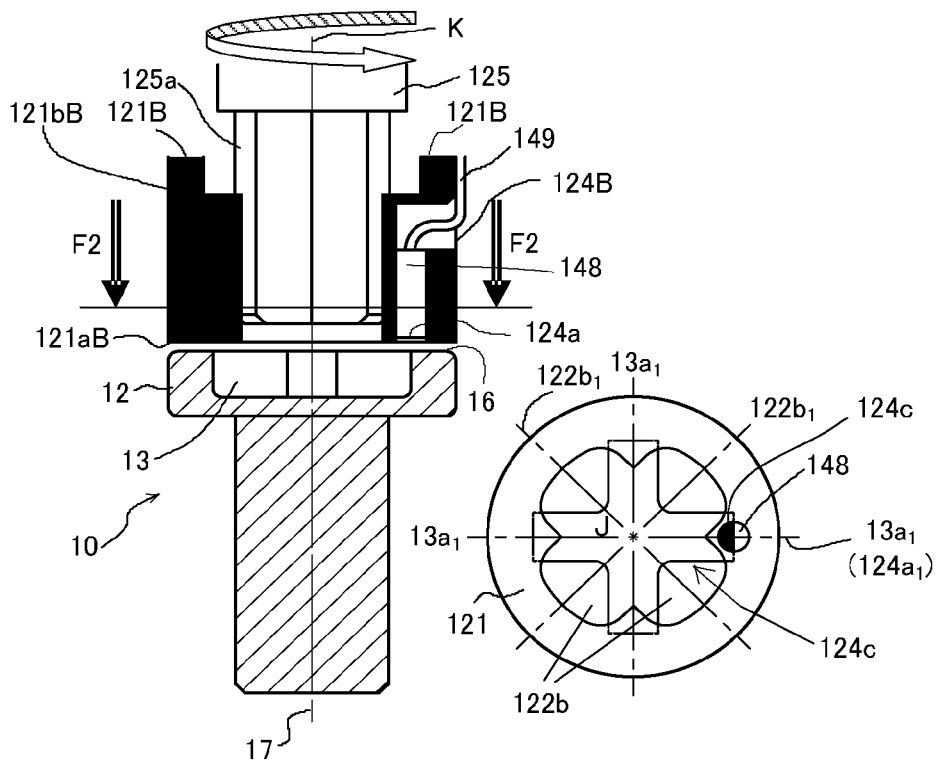
FIGS. 28A and 28B are a longitudinal sectional view and a cross sectional view of the lower portion of the sleeve according to a variation of FIG. 8.

FIG. 27A is a sectional view of the lower portion of the sleeve 121B when the sleeve 121B is located close to the top surface 16 of the screw 10 (at a distance of about 0.2 mm) FIG. 27B is a sectional view of FIG. 27A viewed from an E2-E2 direction. FIG. 28A is a sectional view of the lower portion of the sleeve 121B located at a rotational position that shifts by 45° from FIG. 27A. FIG. 28B is a sectional view of FIG. 28A viewed from an F2-F2 direction. In FIGS. 27B and 28B, the center axis K of the bit 125 or the sleeve 121 is aligned with the center axis 17 of the screw 10 in the vertical direction.

The bottom open end 124a is separated from the absorption hole 122. The bottom open end 124a is formed on the bottom surface 121aB of the sleeve 121B and opened to air. An angle is 45° between a line 124a1 that connects a centerline of the bottom open end 124a and the center J in the radial direction, and the centerline 122b1 of the convex 122b that is closest to the bottom open end 124a. With respect to the above line that connects a centerline of the bottom open end 124a and the center J, the bottom open end 124a is in a line symmetry.

When the bottom open end 124a is viewed from the bottom surface 121aB side of the sleeve 121B, the bottom open end 124a at least partially projects inside of a virtual circle C that passes the outermost diameter of the tip 125a of the bit 125 around the center J. In this embodiment, the projection is connected to or disconnected from the recess 13 according to the rotational position of the sleeve 121B. Due to this structure, the projection can be used as a detector. The bottom open end 124a may be entirely located inside of the circle C, but a function of detecting a positional shift between the centers 17a and J may be lost in this case.

A variety of detectors of this embodiment uses no vacuum monitoring detector 146, but uses the optical sensor 148. The optical sensor 148 of this embodiment is a reflection type photodetector, which can identify the recess 13 from the top surface 16. The reflection type photodetector includes a light emitter and a light receiver, the light emitter uses an LED, and the light receiver uses a PD, a PTr, a photo IC, a modulation light photo IC, etc. If necessary, a member that differentiates the reflectance may be adhered to the recess 13 or the top surface 16. The optical sensor 148 is connected to the cable 149, and the detection result of the optical sensor 148 is transmitted to the cable 149. The cable 149 is connected with the controller 170.

FIGS. 27A and 27B illustrate that the phase of the dent 13a of the recess 13 accords with the phase of the convex 122b of the sleeve 121 (or the projection 126 of the tip 125a of the bit 125), and the centerline 13a1 accords with the centerline 122b1. As illustrated in FIGS. 27A and 27B, when the bottom open end 124a is disconnected from the recess 13, the optical sensor 148 detects the top surface 16 of the screw 10.

On the other hand, FIGS. 28A and 28B illustrate that the phase (of the dent 13a) of the recess 13 shifts by 45° from the phase (of the convex 122b) of the sleeve 121, and the centerline 13a1 that is one of four dents 13a accords with the centerline 122a1. As illustrated in FIGS. 28A and 28B, when the bottom open end 124a is located on the recess 13, the optical sensor 148 can identify the recess 13 at the projection 124c.

Figure 12:
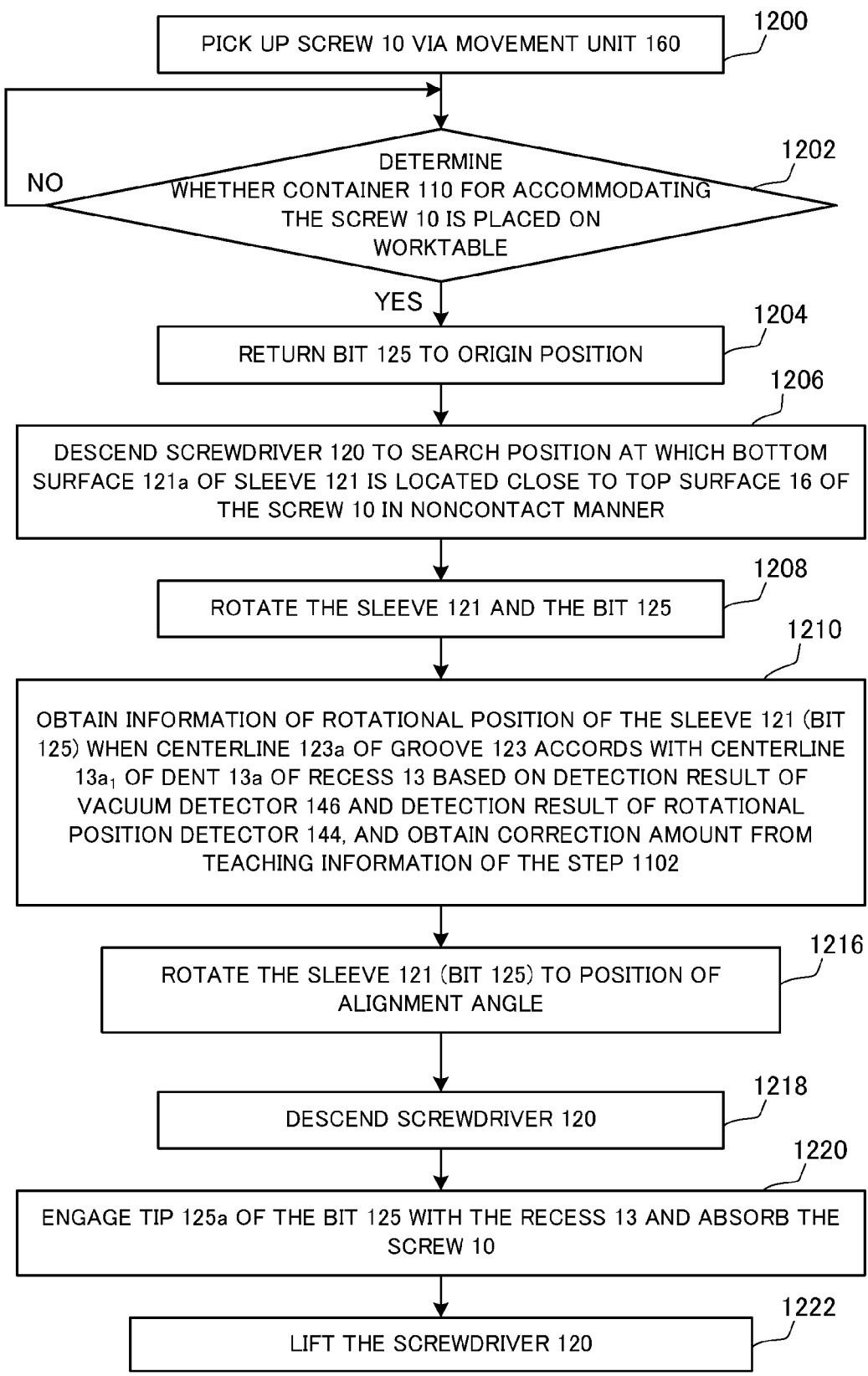
FIG. 12 is a flowchart for explaining the details of the step 1200 illustrated in FIG. 10.

The configuration of this embodiment is applicable to the flowchart illustrated in FIGS. 10 to 12. In this case, the step 1210 illustrated in FIG. 12 may be replaced with "obtain information of a rotational position of the sleeve 121 (bit 125) when a line 124a1 that passes the centerline of the bottom open end 124a accords with the centerline 13a1 of the dent 13a of the recess 13 based on the detection result of the optical sensor 148 and the detection result of the rotational position detector 144, and obtain a correction amount from teaching information of the step 1102."

In addition, as illustrated in the overlap areas 123cA to 123cD in FIG. 22, an area of the projection 124c changes when there is a positional shift between the center 17a and the center J. Therefore, the configuration of this embodiment is applicable to the flowchart illustrated in FIGS. 20 and 21.

In the step 1106 in FIG. 20, the controller 170 stores the teaching of a relationship between the positional shift amount and the light quantity detected by the optical sensor 148 when an accordance between the center 17a and the center J (or the ideal state having a positional shift amount of 0) is destroyed. Thereby, the controller 170 can obtain the detection result of the optical sensor 148 and convert it into the positional shift amount.

The "search position" in the step 1206 in FIG. 21 does not necessarily require a "close" location as long as the optical sensor 148 is located at a detectable position of the shape of the top surface 16 of the screw 10. The step 1212 in FIG. 21 is read in a different way as discussed above. The controller 170 recognizes a positional shift amount from a difference between the light quantity corresponding to the area of the ideal state of the projection 124c and the light quantity corresponding to the real area. Next, the controller 170 drives the movement unit 160 so as to make zero (or reduce) this positional shift amount (step 1214). Thereby, the center 17a accords with the center J.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

The present invention can provide a screw fastener configured to prevent damages of a bit and a recess, and a generation of the abrasion powder.

A screw fastener according to one aspect of the embodiment includes a screwdriver that includes a sleeve having an absorption hole configured to absorb a top surface of a screw, a bit housed in the absorption hole and having a tip engageable with a recess of the screw, and a rotation unit configured to rotate the bit with the sleeve, a movement unit configured to move the screwdriver between a container configured to accommodate the screw and a work, a controller configured to control operations of the screwdriver and the movement unit so as to pick up the screw from the container and to fix a part onto the work with the screw, a pressure detector configured to detect a pressure in the absorption hole, a pressure fluctuation unit configured to fluctuate the pressure in the absorption hole according to a rotational position of the sleeve when the center axis of the screw is aligned with the center axis of the bit and a bottom surface of the sleeve is located close to but spaced from the top surface of the screw, wherein the controller aligns the tip of the bit with the recess of the screw based on a detection result of the pressure detector. This screw fastener rotates the bit with the sleeve, and thus causes less dust or fewer deformations than a screw fastener in which the screw is inserted into the absorption hole of the sleeve and the sleeve rotates but the sleeve is maintained stationary. In addition, since the pressure detector detects as a pressure fluctuation an alignment position between the bit's tip and the screw's recess while the bit and the screw are maintained in a noncontact manner, the dust generations and the damages or deformations of the bit and the screw reduce in comparison with the bit's tip idles on the top surface of the screw. The reduced dust generations provide effects of eliminating or reducing pollution and electric short circuit of the product, and the reduced deformations provide effects of eliminating or reducing defective screw fastening with a predetermined torque, defective products, or extra tool exchange processes. Thus, this screw fastener converts a phase of the recess into a pressure fluctuation, and achieves an alignment between the tip of the bit and the recess of the screw with a simple structure.

The pressure fluctuation unit may include a groove configured to connect the absorption hole to and disconnect the absorption hole from air external to the sleeve according to a rotational position of the sleeve. Since this configuration connects the absorption hole to the external air according to the rotational position of the sleeve, the pressure can be fluctuated with a simpler structure than, for example, a configuration that detects a rotational position of the sleeve and changes a suction force by a vacuum drawer according to the rotational position. The groove may be provided, for example, on the bottom surface of the sleeve or on the top surface of the recess.

For example, the pressure fluctuation unit includes a groove provided on a bottom surface of the sleeve, separated from the absorption hole, and open to air, wherein when the sleeve is viewed from a bottom surface side, the groove projects inside of a virtual circle that passes an outermost diameter of the tip of the bit around a center as a center axis of the bit. By this structure, the projection may be connected to or disconnected from the absorption hole.

The number of grooves may be equal to or smaller than the number of projections of the tip of the bit. The S/N ratio can be improved or the influence of the shape error can be reduced by increasing the number of grooves when the pressure detector detects the pressure fluctuation. As a result, the accuracy of the alignment between the projection of the bit's tip and the recess of the screw can improve.

The absorption hole may be smaller than a screw head of the screw. Thereby, the dust generations and the deformations reduce in comparison with a screw fastener in which the screw is inserted into the absorption hole of the sleeve and the sleeve rotates but the sleeve is maintained stationary.

The screw fastener may further include a sleeve holder having a central perforation hole connected to the absorption hole and configured to accommodate the sleeve rotatably, and a vacuum drawer configured to draw a vacuum in the absorption hole. The vacuum drawer includes a suction plug attached to a side perforation hole provided in a side surface of the sleeve holder and connected to the central perforation hole, maintained stationary with the sleeve holder when the sleeve rotates with the bit, and configured to draw a vacuum in the absorption hole through the side perforation hole and the central perforation hole. Since the suction plug does not rotate even when the bit rotates, an arrangement of the tube connected to the suction plug becomes easier.

The screw fastener may further include a rotational position detector configured to detect a rotational angle of the bit. In addition, the controller may rotate the sleeve and the bit via the rotational unit while the bottom surface of the sleeve and the top surface of the screw are being maintained in the noncontact manner. In addition, the controller may obtain from the rotational position detector the rotational angle of the bit corresponding to a peak value of the pressure detected by the pressure detector. In addition, the controller may rotate the sleeve and the bit via the rotation unit to a position corresponding to an angle between a centerline of the groove and a centerline of the projection of the tip of the bit, based on the rotational angle of the bit obtained from the rotational position detector. In addition, the controller may control the movement unit so that the tip of the bit can be engaged with the recess of the screw. This configuration can automatically provide an alignment between the projection of the bit's tip and the recess of the screw.

Where n is the number of convexes of the absorption hole, an angle may be 360°/2n between the centerline of the groove and a centerline of the convex of the absorption hole closest to the groove. Thereby, the alignment becomes simple because in rotating the sleeve for the alignment between the projection of the bit's tip and the recess of the screw after the centerline of the groove accords with the centerline of the dent of the recess of the screw, the rotational direction may be clockwise or counterclockwise. In addition, since a rotational amount is fixed to one irrespective of the rotational direction.

Where n is the number of projections of the tip of the bit, the controller rotates the sleeve and the bit by an angle between 360°/n and 360° via the rotational unit while the bottom surface of the sleeve and the top surface of the screw is being maintained in a noncontact manner. When the rotational amount is set to 360°/n, the alignment can be completed quickly. When the rotational amount is set to 360°, peaks of a plurality of pressure fluctuations (or pressure drops) can be obtained and the alignment accuracy is improved through the averaging effect of them, etc.

What is claimed is:

1. A screw fastener comprising:
   a screwdriver that includes a sleeve having an absorption hole configured to absorb a top surface of a screw, a bit housed in the absorption hole and having a tip engageable with a recess of the screw, and a rotation unit configured to rotate the bit with the sleeve;
   a movement unit configured to move the screwdriver between a container configured to accommodate the screw and a work;
   a controller configured to control operations of the screwdriver and the movement unit so as to pick up the screw from the container and to fix a part onto the work with the screw;
   a pressure detector configured to detect a pressure in the absorption hole;

a pressure fluctuation unit configured to fluctuate the pressure in the absorption hole according to a rotational position of the sleeve when the center axis of the screw is aligned with the center axis of the bit and a bottom surface of the sleeve is located close to but spaced from the top surface of the screw, wherein the controller aligns the tip of the bit with the recess of the screw based on a detection result of the pressure detector.

2. The screw fastener according to claim 1, wherein the pressure fluctuation unit includes a groove configured to connect the absorption hole to and disconnect the absorption hole from air external to the sleeve according to a rotational position of the sleeve.

3. The screw fastener according to claim 2, wherein the groove is provided on a bottom surface of the sleeve.

4. The screw fastener according to claim 2, wherein the groove is provided on the top surface of the screw.

5. The screw fastener according to claim 1, wherein the pressure fluctuation unit includes a groove provided on a bottom surface of the sleeve, separated from the absorption hole, and open to air, and wherein when the sleeve is viewed from a bottom surface side, the groove projects inside of a virtual circle that passes an outermost diameter of the tip of the bit around a center as a center axis of the bit.

6. The screw fastener according to claim 5, wherein the number of grooves is equal to or smaller than the number of projections of the tip of the bit.

7. The screw fastener according to claim 1, wherein the absorption hole is smaller than a screw head of the screw.

8. The screw fastener according to claim 1, further comprising:

a sleeve holder having a central perforation hole connected to the absorption hole and configured to accommodate the sleeve rotatably; and a vacuum drawer configured to draw a vacuum in the absorption hole, wherein the vacuum drawer includes a suction plug attached to a side perforation hole provided in a side surface of the sleeve holder and connected to the central perforation hole, maintained stationary with the sleeve holder when the sleeve rotates with the bit, and configured to draw a vacuum in the absorption hole through the side perforation hole and the central perforation hole.

9. The screw fastener according to claim 1, further comprising a rotational position detector configured to detect a rotational angle of the bit, wherein the controller rotates the sleeve and the bit via the rotational unit while the bottom surface of the sleeve and the top surface of the screw are being maintained in a noncontact manner, wherein the controller obtains from the rotational position detector the rotational angle of the bit corresponding to a peak value of the pressure detected by the pressure detector, wherein the controller rotates the sleeve and the bit via the rotation unit to a position corresponding to an angle between a centerline of the groove and a centerline of the projection of the tip of the bit, based on the rotational angle of the bit obtained from the rotational position detector, and wherein the controller controls the movement unit so that the tip of the bit can be engaged with the recess of the screw.

10. The screw fastener according to claim 9, wherein where n is the number of convexes of the absorption hole, an angle is 360°/2n between the centerline of the groove and a centerline of the convex of the absorption hole closest to the groove.

11. The screw fastener according to claim 9, wherein where n is the number of projections of the tip of the bit, the controller rotates the sleeve and the bit by an angle between 360°/n and 360° via the rotational unit while the bottom surface of the sleeve and the top surface of the screw is being maintained in a noncontact manner.

* * * * *